US012625677B2

(12) United States Patent
Jayadeva

(10) Patent No.: US 12,625,677 B2
(45) Date of Patent: May 12, 2026

(54) CIRCUIT FOR EFFICIENTLY PERFORMING OPERATIONS ON INPUT DATA TO COMPUTE AN INTERPRETABLE AND DIFFERENTIABLE FUNCTION

(71) Applicant: SPARSEMIND TECHNOLOGY LABS PRIVATE LIMITED, Gurugram (IN)

(72) Inventor: Jayadeva, New Delhi (IN)

(73) Assignee: SPARSEMIND TECHNOLOGY LABS PRIVATE LIMITED, Gurugram (IN)

( * ) Notice: Subject to any disclaimer, the term of this patent is extended or adjusted under 35 U.S.C. 154(b) by 0 days.

(21) Appl. No.: 19/232,245

(22) Filed: Jun. 9, 2025

(65) Prior Publication Data

US 2025/0377860 A1      Dec. 11, 2025

(30) Foreign Application Priority Data

Jun. 10, 2024    (IN) .............................. 202411044842

(51) Int. Cl.
*G06F 7/544*          (2006.01)
*G06F 7/556*          (2006.01)
*G06N 3/063*          (2023.01)

(52) U.S. Cl.
CPC ............ *G06F 7/5443* (2013.01); *G06F 7/556* (2013.01); *G06N 3/063* (2013.01); *G06F 2207/4824* (2013.01)

(58) Field of Classification Search
CPC ...... G06N 3/048; G06N 3/063; G06F 7/5443; G06F 7/4833; G06F 7/556; G06F 2101/10; G06F 17/11; G06F 2207/4824
See application file for complete search history.

(56) References Cited

U.S. PATENT DOCUMENTS

| | | | |
|---|---|---|---|
| 6,678,710 B1 * | 1/2004 | Shankar ................ | G06F 7/4833 |
| | | | 708/517 |
| 2020/0125330 A1 * | 4/2020 | Johnson ................. | G06F 7/556 |
| 2020/0394507 A1 * | 12/2020 | He ......................... | G06N 3/045 |
| 2021/0173617 A1 * | 6/2021 | Ware ..................... | G06F 7/4833 |

* cited by examiner

*Primary Examiner* — Matthew D Sandifer

(57) ABSTRACT

A circuit for efficiently performing operations on input data to compute an interpretable and differentiable function, comprising a first level processing unit that obtains one or more first level inputs and a second level processing unit. The first level processing unit comprises (i) a first level MA unit that is configured to compute a first level weighted sum of the one or more first level inputs, and (ii) a logarithmic unit that is configured to compute a first level output. The second level processing unit obtains one or more second level inputs. The second level processing unit comprising (i) a second level MA unit that is configured to compute a second level weighted sum of the one or more second level inputs, and adding the computed second level product, and (ii) an antilog unit that is configured to compute a second level output.

20 Claims, 9 Drawing Sheets

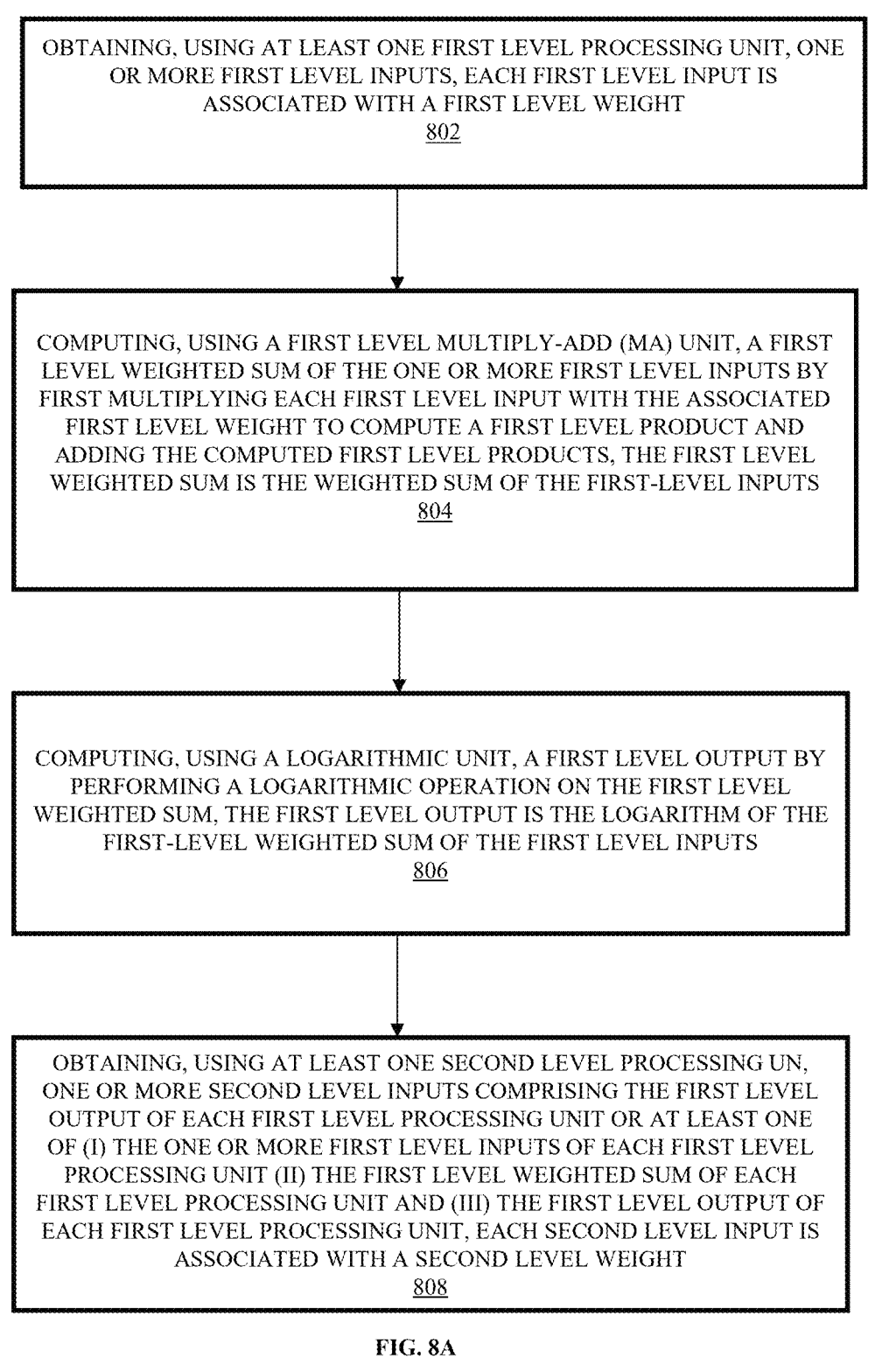

OBTAINING, USING AT LEAST ONE FIRST LEVEL PROCESSING UNIT, ONE OR MORE FIRST LEVEL INPUTS, EACH FIRST LEVEL INPUT IS ASSOCIATED WITH A FIRST LEVEL WEIGHT
802

COMPUTING, USING A FIRST LEVEL MULTIPLY-ADD (MA) UNIT, A FIRST LEVEL WEIGHTED SUM OF THE ONE OR MORE FIRST LEVEL INPUTS BY FIRST MULTIPLYING EACH FIRST LEVEL INPUT WITH THE ASSOCIATED FIRST LEVEL WEIGHT TO COMPUTE A FIRST LEVEL PRODUCT AND ADDING THE COMPUTED FIRST LEVEL PRODUCTS, THE FIRST LEVEL WEIGHTED SUM IS THE WEIGHTED SUM OF THE FIRST-LEVEL INPUTS
804

COMPUTING, USING A LOGARITHMIC UNIT, A FIRST LEVEL OUTPUT BY PERFORMING A LOGARITHMIC OPERATION ON THE FIRST LEVEL WEIGHTED SUM, THE FIRST LEVEL OUTPUT IS THE LOGARITHM OF THE FIRST-LEVEL WEIGHTED SUM OF THE FIRST LEVEL INPUTS
806

OBTAINING, USING AT LEAST ONE SECOND LEVEL PROCESSING UN, ONE OR MORE SECOND LEVEL INPUTS COMPRISING THE FIRST LEVEL OUTPUT OF EACH FIRST LEVEL PROCESSING UNIT OR AT LEAST ONE OF (I) THE ONE OR MORE FIRST LEVEL INPUTS OF EACH FIRST LEVEL PROCESSING UNIT (II) THE FIRST LEVEL WEIGHTED SUM OF EACH FIRST LEVEL PROCESSING UNIT AND (III) THE FIRST LEVEL OUTPUT OF EACH FIRST LEVEL PROCESSING UNIT, EACH SECOND LEVEL INPUT IS ASSOCIATED WITH A SECOND LEVEL WEIGHT
808

FIG. 8A

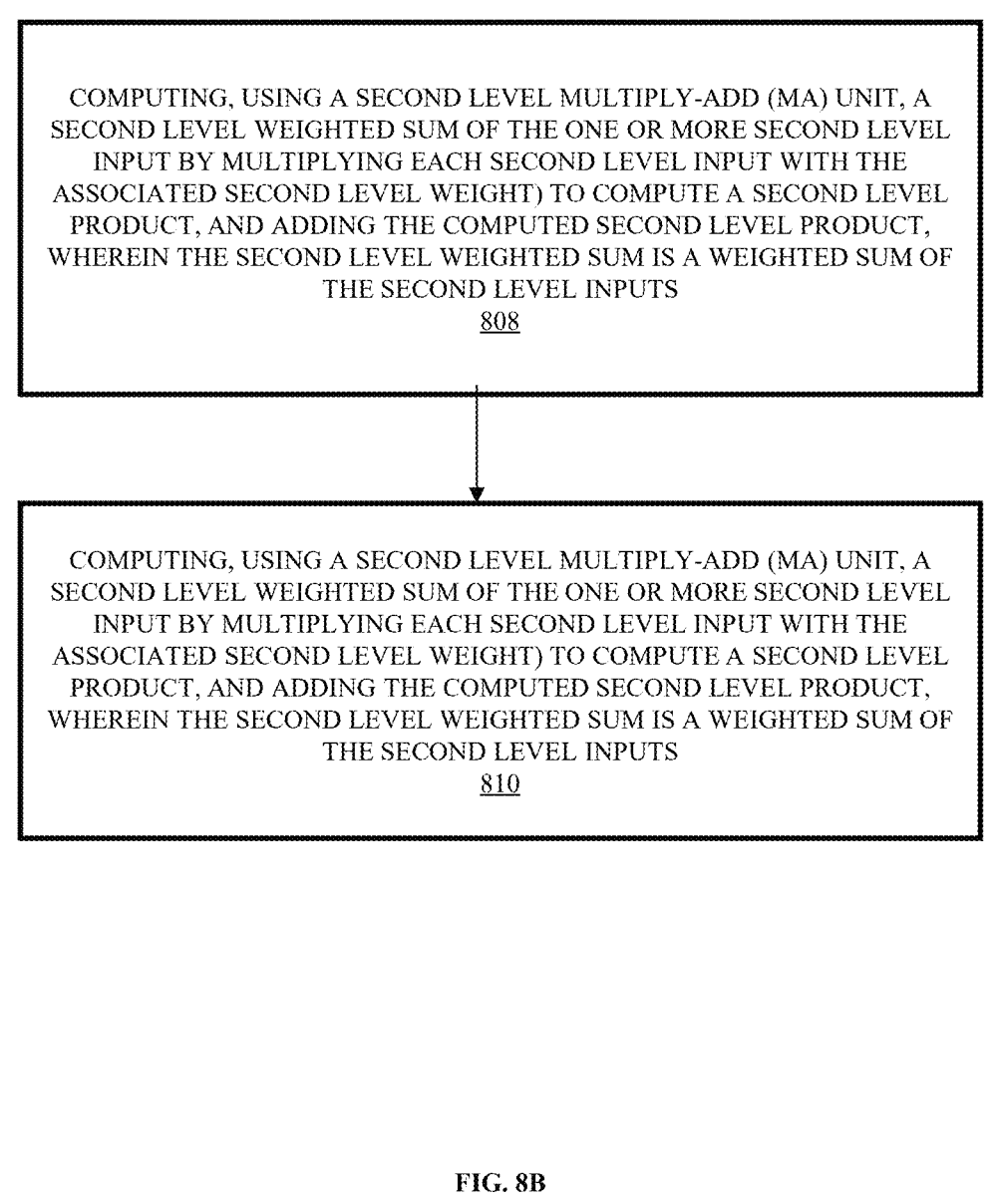

COMPUTING, USING A SECOND LEVEL MULTIPLY-ADD (MA) UNIT, A SECOND LEVEL WEIGHTED SUM OF THE ONE OR MORE SECOND LEVEL INPUT BY MULTIPLYING EACH SECOND LEVEL INPUT WITH THE ASSOCIATED SECOND LEVEL WEIGHT) TO COMPUTE A SECOND LEVEL PRODUCT, AND ADDING THE COMPUTED SECOND LEVEL PRODUCT, WHEREIN THE SECOND LEVEL WEIGHTED SUM IS A WEIGHTED SUM OF THE SECOND LEVEL INPUTS
808

COMPUTING, USING A SECOND LEVEL MULTIPLY-ADD (MA) UNIT, A SECOND LEVEL WEIGHTED SUM OF THE ONE OR MORE SECOND LEVEL INPUT BY MULTIPLYING EACH SECOND LEVEL INPUT WITH THE ASSOCIATED SECOND LEVEL WEIGHT) TO COMPUTE A SECOND LEVEL PRODUCT, AND ADDING THE COMPUTED SECOND LEVEL PRODUCT, WHEREIN THE SECOND LEVEL WEIGHTED SUM IS A WEIGHTED SUM OF THE SECOND LEVEL INPUTS
810

FIG. 8B

CIRCUIT FOR EFFICIENTLY PERFORMING OPERATIONS ON INPUT DATA TO COMPUTE AN INTERPRETABLE AND DIFFERENTIABLE FUNCTION

BACKGROUND

Technical Field

The embodiments herein generally relate to an interpretable neural network and, more particularly, a circuit for efficiently performing operations on input data to compute an interpretable and differentiable function. The disclosure also relates to a processor-implemented method for efficiently performing operations on input data to compute an interpretable and differentiable function.

Description of the Related Art

In recent years, there has been a growing interest in developing neural network architectures that can effectively learn and represent complex input-output mappings in a transparent and interpretable manner. One significant challenge in this area is balancing model complexity with interpretability, as traditional neural networks often lack transparency due to their black-box nature.

Another key challenge is attaining differentiable computation that is both stable and meaningful across all layers of the network. In many traditional architectures, differentiation can become numerically unstable or lose significance in very deep models, leading to gradient vanishing or exploding issues. This hampers effective learning and limits the ability to precisely control or interpret how parameter changes affect the overall function being learned.

Overfitting is also a persistent problem in standard neural networks, particularly those with a large number of parameters. Models tend to memorize training data instead of learning generalized patterns, which leads to poor performance on new, unseen data. Deep architectures, due to their high capacity, are especially prone to this behavior when trained on limited or noisy datasets.

Although it has been shown that a 3-layer neural network can learn any input-output map, a constructive method for realizing such a network has not been established in the literature. Most current AI/ML methods use deep neural network architectures with a large number of layers. Deep neural networks often comprise hundreds or even thousands of layers. The performance of Large Language Models (LLMs) and image recognition systems stems from these deep architectures. However, such networks contain billions of parameters, demanding immense computational resources for both training and inference. The resulting high-power consumption poses a major challenge to their deployment, particularly on resource-constrained platforms. Recently, there has been a renewed focus on neural networks with a small number of layers that can learn from a given dataset. Traditional transformer neural networks face challenges in learning long-range dependencies in sequential data efficiently. The computational cost of capturing dependencies that rely on pairwise correlations between tokens or features increases quadratically or even exponentially with the number of tokens used. This exponential growth in computational cost poses significant challenges in training transformer models effectively and limits their applicability to real-world tasks. Moreover, a limitation of many AI and machine learning methods is their lack of interpretability. Neural network models often fail to provide insight into how they make predictions or how recognition systems operate, functioning instead as black boxes. This becomes especially problematic in domains like experimental data analysis, where quantitative predictions alone may be insufficient, and a clear understanding of the underlying reasoning is essential for scientific interpretation.

These challenges lack of interpretability, unstable differentiability, and overfitting, are compounded by the software-based, abstract nature of typical neural networks. As an alternative, focusing on circuit-level implementations of neural networks offers a structured and physical framework that can help address these issues. However, implementing such models directly in circuit form introduces its complexities, such as maintaining smooth differentiability and functional clarity while minimizing hardware resource usage. The challenge lies in designing circuits that not only compute correctly, but also inherently support traceable, generalizable, and well-conditioned learning behavior.

Accordingly, there remains a need for a more efficient method for mitigating and/or overcoming drawbacks associated with current methods.

SUMMARY

In view of the foregoing, embodiments herein provide a circuit for efficiently performing operations on input data to compute an interpretable and differentiable function. The circuit includes at least one first level processing unit and at least one second level processing unit. The at least one first level processing unit obtains one or more first level inputs. Each first level input is associated with a first level weight, the first level processing unit. The at least one first level processing unit includes a first level multiply-add (MA) unit and a logarithmic unit. The first level multiply-add (MA) unit configured to compute a first level weighted sum of the one or more first level inputs by first multiplying each first level input with the associated first level weight to compute a first level product and adding the computed first level products. The first level weighted sum is the weighted sum of the first-level inputs. The logarithmic unit that is configured to compute a first level output by performing a logarithmic operation on the first level weighted sum. The first level output is the logarithm of the first-level weighted sum of the first level inputs. The at least one second level processing unit obtains one or more second level inputs include the first level output of each first level processing unit or at least one of (i) the one or more first level inputs of each first level processing unit (ii) the first level weighted sum of each first level processing unit and (iii) the first level output of each first level processing unit. Each second level input is associated with a second level weight. The at least one second level processing unit includes a second level multiply-add (MA) unit and an antilog unit. The second level multiply-add (MA) unit is configured to compute a second level weighted sum of the one or more second level inputs by multiplying each second level input with the associated second level weight to compute a second level product, and adding the computed second level product. The second level weighted sum is a weighted sum of the second level inputs. The antilog unit is configured to compute a second level output by performing an antilog operation on the second level weighted sum. The second level output is a product of weighted polynomials of the first level inputs or a product of (i) weighted polynomials of the one or more first level inputs and (ii) weighted exponentials of the one or more first level inputs and (iii) weighted exponentials of the one or more first level weighted sum of the first level processing units. The second level output is an interpretable and differentiable function.

In some embodiments, the circuit includes a storage unit and a control unit. The storage unit is configured to store (i) the first level inputs, first level weights, first level weighted sums, the first level output of each first level processing unit, and (ii) the second level inputs, second level weights, second level weighted sums, and the second level output of each second level processing unit. The circuit includes program instructions that are configured to initialize the weights of the one or more first level inputs and the one or more second level inputs to compute the second level output corresponding to the one or more first level inputs. The program instructions are configured to update the weights of the one or more first level inputs and the one or more second level inputs using a training algorithm that is selected from one or more training algorithms, to learn an input-output mapping function when the circuit dynamically receives input data. The program instructions are further configured to update the weights of the one or more first level inputs and the one or more second level inputs by (i) producing an expression corresponding to the second level output; and (ii) computing derivatives or partial derivatives of desired orders of the second level output by using the expression corresponding to the second level output. The program instructions are further configured to determine an importance of the one or more first level inputs using the updated weights associated with the one or more first level inputs and the one or more second level inputs, removing near-zero weights assigned to at least one of the one or more first level inputs to improve efficiency and reduce overfitting, thereby the circuit automatically learns which first level inputs are more relevant during training. The control unit is configured to orchestrate the program instructions of the circuit.

In some embodiments, the circuit includes at least one third level processing unit that obtains one or more third level inputs includes (a) the second level output of the at least one second level processing units or (b) the one or more first level inputs of each first level processing unit, the first level weighted sum of each first level processing unit, the first level output of each first level processing unit, the second level weighted sum of each second level processing unit, and the second level output of each second level processing unit. Each third level input is associated with a third level weight. The third level processing unit includes a third level multiply-add (MA) unit and an output function unit. The third level multiply-add (MA) unit is configured to compute a third level weighted sum of the one or more third level inputs by multiplying each third level input with the associated third level weight to compute a third level product, and adding the computed third level products. The third level weighted sum is the weighted sum of the third level inputs of third level processing units. The output function unit is configured to compute a third level output by performing an output function operation on the third level weighted sum. The third level output is the output function operated on the third level weighted sum.

In some embodiments, the circuit includes a storage unit and a control unit. The storage unit is configured to store the third level inputs, third level weights, the third level weighted sums, the third level output of each third level processing unit. The circuit includes program instructions that are configured to initialize the weights of the one or more first level inputs, the one or more second level inputs, and the one or more third level inputs to compute the third level output. The program instructions are further configured to update the weights of the one or more first level inputs, the one or more second level inputs, and the one or more third level inputs by producing an expression corresponding to the third level output; and (ii) computing derivatives or partial derivatives of desired orders of the third level output by using the expression corresponding to the third level output. The control unit configured to orchestrate the program instructions of the circuit.

In some embodiments, the second level output is a product of degree one polynomials of the one or more first level inputs. The second level output is an interpretable and differentiable function composed of a product of linear polynomials. The differentiable functions are computed by changing the weights associated with first level inputs.

In some embodiments, the second level weights associated with second level inputs of the processing unit are all set to one to further optimize computational efficiency.

In some embodiments, the circuit is embodied to implement a two-layer neural network. The two-layer neural network includes at least one of first layer neuron circuit and at least one second layer neuron circuit. The at least one of first layer neuron circuit obtains one or more first layer inputs, each first layer input associated with a first layer weight. Each first layer neuron circuit is configured to (i) compute a first layer weighted sum by multiplying each first layer input with the associated first layer weight to compute a first layer product and adding the computed first layer products, and (ii) pass the first layer weighted sum through a logarithm activation function to produce a first layer neuron output. The first layer weighted sum is a weighted sum of the first level inputs. The first layer output is the logarithm of the first layer weighted sum of the first layer inputs. The at least one second layer neuron circuit that obtains at least one of second layer inputs, includes the one or more first layer inputs of each first layer neuron circuit, the first layer weighted sum of each first layer neuron circuit, and the first layer output of each first layer neuron circuit. Each second layer input is associated with a second layer weight. Each second layer neuron circuit is configured to (i) compute a second layer weighted sum by multiplying each second layer input with the associated second layer weight to compute a second layer product, and adding the computed second layer products, and (ii) pass the second layer weighted sum through an antilog activation function to produce a second layer neuron output. The second layer output comprises a product of (i) weighted polynomials of the one or more first layer inputs (ii) the weighted exponentials of the first layer inputs, and (iii) weighted exponentials of the first layer weighted sums.

In some embodiments, the circuit is embodied to implement the two-layer neural network capable of inferencing and learning the weights of the one or more first layer inputs of each first layer neuron circuit, the weights of the one or more second layer inputs of each second layer neuron circuit, and the second layer output of each second layer neuron circuit. The circuit (i) selects a training algorithm to compute the weights of the circuit used in the two-layer neural network, using the first layer inputs and the second layer inputs obtained for training the neural network, (ii) executes the selected training algorithm, (iii) uploads the weights associated with the one or more first layer inputs and the one or more second layer inputs into the circuit using the program instructions, (iv) generates, by the two-layer neural network, the second level output using the updated weights learned by the selected training algorithm. The program instructions are defined for inferencing.

In some embodiments, the circuit is embodied to implement a three-layer neural network. The three-layer neural network includes at least one of third layer neuron circuit that obtains at least one of third layer input, includes the one or more first layer inputs of each first layer neuron circuit, the first layer weighted sum of each first layer neuron circuit, the first layer output of each first layer neuron circuit, the second layer output of each second layer processing unit, the second layer weighted sum of each second layer neuron circuit, and the second layer output of each second layer neuron circuit. Each third layer neuron circuit is configured to (i) compute a third layer weighted sum by multiplying each third layer input with the associated third layer weight to compute a third layer product and add the computed third layer products and (ii) produce a third layer output by passing the third layer weighted sum through an output activation function. The third layer output is the output activation function applied on the third layer weighted sum.

In some embodiments, the circuit is embodied to implement the three-layer neural network capable of inferencing and learning the associated weights of the one or more first layer inputs of each first layer neuron circuit, the associated weights of the one or more second layer inputs of each second layer neuron circuit, the second layer output of each second layer neuron circuit, the associated weights of the one or more third layer inputs of each first third layer neuron circuit, and the third layer output of each third layer neuron circuit. The circuit (i) selects a training algorithm to compute the weights of the circuit used in the three-layer neural network, using the first layer inputs, the second layer inputs, the third layer inputs, the first layer outputs, the second layer outputs, and the third layer outputs obtained for training the neural network, (ii) executes the selected training algorithm, and (iii) upload the weights associated with the one or more first layer inputs, the weights associated with one or more second layer inputs, and the weights associated with one or more third layer inputs into the circuit using the program instructions, and (iv) generates, by the three-layer neural network, the third layer outputs using the updated weights learned by the selected training algorithm.

In some embodiments, weights of a first circuit are initialized and modified by configuring the program instructions that operate on the weighted sums, the inputs, and the outputs of the first circuit and one or more second circuits.

In some embodiments, the first circuit is configured to produce an encrypted signal of the input, wherein the second circuit decrypts of the encrypted signals by a second three layer circuit, with the weights associated with the first, second, and third level inputs of the second circuit having condition with the weights associated with the third, second, and first layer inputs of the first circuit, respectively, the weights of the connections are represented by matrices, wherein the matrices satisfy the conditions to enable the decryption, the conditions are if all matrices contain real-valued elements or if the matrices contain complex-valued elements, wherein a number of inputs, and a number of processing units at the first, second, and third levels are all equal.

In some embodiments, the circuit is configured to represent shapes and functions by using the weights of the first level, second level, and third level processing units. The circuit is configured to identify similar shapes and functions by matching the weights corresponding to stored shapes and functions with the weights corresponding to shapes and functions in the input.

In some embodiments, the third level outputs of the first circuit are fed to the a second circuit as input, wherein the first circuit encodes the first level inputs of the first circuit to produce the third level outputs to change a dimensionality of the input that is suitable for the second circuit; and the second circuit is configured to decode the third level outputs of the first circuit to produce the first level inputs of the first circuit.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications

BRIEF DESCRIPTION OF THE DRAWINGS

The embodiments herein will be better understood from the following detailed description with reference to the drawings, in which:

FIGS. 8A and 8B are flow diagrams that illustrate a method of a circuit for efficiently performing operations on input data to compute an interpretable and differentiable function according to some embodiments herein.

DETAILED DESCRIPTION OF PREFERRED EMBODIMENTS

Figure 1:
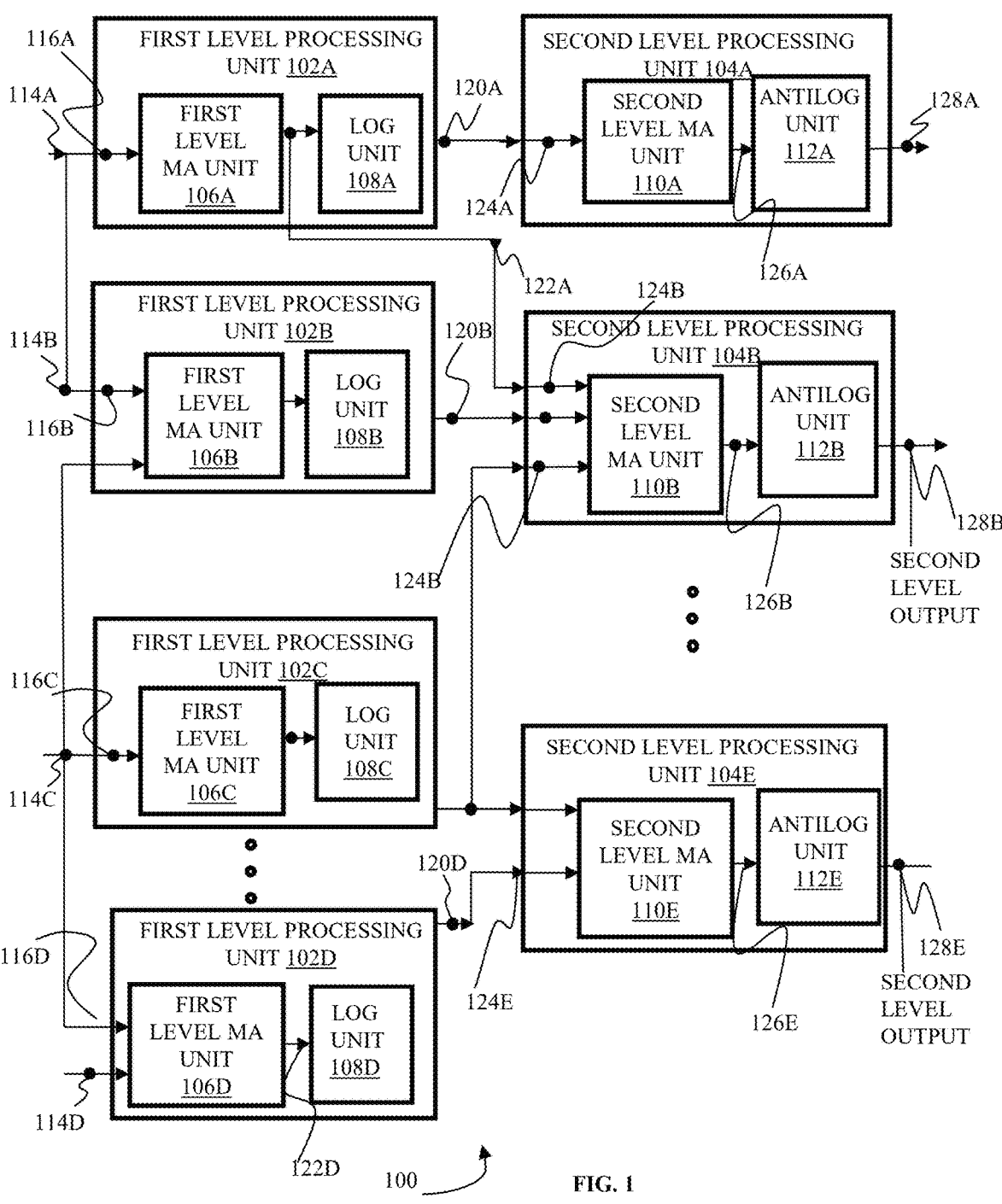
FIG. 1 is a block diagram that illustrates a circuit that includes two level processing units for efficiently performing operations on input data to compute an interpretable and differentiable function according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The term "input-output mappings" refers to relations between input data and corresponding output results, defining how input data transforms into desired output outcomes within a given system or model. These relations are also referred to as functions describing input-output relationships.

The term "interpretable neural network" is defined as a neural network architecture that produces understandable and explainable outputs.

The term "layer", in the context of the interpretable neural network, refers to a layer of weights followed by neurons, or a layer of weights alone.

The term "weight", in the context of the interpretable neural network, refers to the co-efficient or weight associated with a connection from an input, weighted sum, or output of one neuron, to another neuron's input. An absent connection is equivalent to a connection with a weight of zero.

The term "neuron", in context of the interpretable neural network, refers to a component that receives inputs via weighted connections, wherein each input is multiplied by its corresponding weight, and all weighted inputs are summed up, and added with a bias or offset term, and then passed through an activation function to generate the neuron output.

The term "activation function", in context of the interpretable neural network, refers to a function that operates on the net input to a neuron, which is the weighted sum of inputs added to a bias or offset, to generate the neuron's output, wherein the said function could be a linear or nonlinear function for regression tasks, or a sigmoid or step function for classification tasks. The term "activation function" is referred to as "act( )" in the drawings.

As mentioned, there remains a need for a circuit for efficiently performing operations on input data to compute an interpretable and differentiable function. Referring now to the drawings, and more particularly to FIGS. 1 through 8B, where similar reference characters denote corresponding features consistently throughout the figures, there are shown preferred embodiments.

FIG. 1 is a block diagram that illustrates a circuit 100 that includes two level processing units for efficiently performing operations on input data to compute an interpretable and differentiable function according to some embodiments herein. The circuit 100 includes first level processing units 102A-D and second level processing units 104A-E.

The first level processing units 102A-D obtain one or more first level inputs 114A-D. Each first level input 114A-D is associated with its corresponding first level weight 116A-D. The first level inputs may include, but are not limited to, real-time sensor outputs (e.g., temperature, pressure, vibration, or signal amplitude), image or signal features (e.g., intensity values, gradients, frequency components), values from structured data (e.g., user attributes, financial indicators, or operational metrics), or intermediate outputs from another processing unit, algorithm, or layer. The first level processing units 102A-D obtain the first level inputs through a user device. In some embodiments, the user device, without limitation, is selected from a Personal Digital Assistant (PDA), a tablet, a desktop computer, a laptop computer, and the like.

The first-level processing units 102A-D include first-level multiply-add (MA) units 106A-D and logarithmic units 108A-D. The first level multiply-add (MA) units 106A-D are configured to compute a first level weighted sum 122A-D of the one or more first level inputs. Let's consider the i-th first level processing unit 102. The first level weighted sum of the i-th first level processing unit is denoted by $$net_i^1$$

and is given by, $$net_i^1 = \sum_{j=1}^{n} u_{ij}x_j + \theta_i$$

Where $\theta_i$ is a bias term that is added to the weighted sum. Without loss of generality, it is assumed that the first-layer inputs include a constant input with a value of 1. The first level weighted sum with one first level input being a constant equal to 1, with an associated weight of $\theta_i$ associated with the constant input, serves an equivalent role. This means $\theta_i$ is assumed as the weight of the constant input that is always 1. This keeps all inputs and weights in the same format.

The first level multiply-add (MA) units 106A-D multiply each first level input with the associated first level weight to compute a corresponding first level product. The first level multiply-add (MA) units 106A-D add the computed first level products to obtain the first level weighted sum. The first level weighted sum is the weighted sum of the first-level inputs.

The logarithmic unit 108A-D is configured to compute a first level output 120A-D by performing a logarithmic operation on the first level weighted sum. Let's assume the base of the logarithm as $e \approx 2.71828$ (default). In hardware implementations, such as VLSI or digital circuits, a base of 2 is commonly used. The first level output is the logarithm of the first-level weighted sum of the first level inputs. The first level output of the $i^{th}$ first level processing unit 102 is denoted by $y_i$ and is given by, $$y_i = \log(net_i^1) = \log\left(\sum_{j=1}^{n} u_{ij}x_j\right)$$

Since changing the base of the logarithm introduces only a constant scaling factor (e.g.,).

$$\log_2(net_i^1) = \frac{\log_e(net_i^1)}{\log_e(2)},$$

$$\log_e^1(net_i^1) = \frac{\log_2(net_i^1)}{\log_2(e)}$$

So, the overall effect of changing the base is multiplying by a constant. The functions log( ) and exp( ) are referred to without specifying the base. The circuit 100 selects an appropriate base based on implementation requirements.

In some embodiments, a selection of the base for the logarithm activation function as "g" is enabled, instead of the base of a Naperian logarithm e(=2.71828 . . . ), wherein the exponential activation function $e^{netinput}$ is replaced by $g^{netinput}$. In some embodiments, "g" is chosen to be 2 (i.e. g=2), to facilitate implementation on a digital computer or for a hardware realization. In some embodiments, "g" is chosen to be a power of 2 (i.e. g=$2^k$, with k being a positive or a negative integer), to enable implementation on a digital computer or for a hardware realization.

The logarithmic function, log(x) does not accept zero or negative inputs. The circuit 100 pre-processes the first level inputs to keep the inputs within a positive range by replacing log(x) with log(x+θ), where θ is a small positive bias that shifts the input into positive range. The circuit 100 prepro- cesses the inputs to avoid zero and negative values.

In some embodiments, the circuit 100 computes log(|x|+ θ). In this approach, the circuit 100 computes absolute value of x to manage the negative inputs and add a small offset θ to avoid zero input to the log( ) function.

For example, the circuit 100 uses a Rectified Linear Unit (ReLU) function. The ReLU outputs the input itself when the input is positive and returns zero otherwise. The ReLu activation ensures that the circuit 100 only forwards non- negative values, which avoids undefined behavior in the logarithmic computation.

The circuit 100 computes a broader class of functions using complex-valued weights. The complex number can be represented in polar or radian form. In the polar form, the complex number x may be written as x=Mexp($\sqrt{-1}$φ) where M is the magnitude of the complex number x and φ is the phase angle. The logarithm of the complex number is given by $$\log(x) = \log(M) + \sqrt{-1}\,\phi$$

The magnitude M is always non-negative, thereby avoiding issues associated with applying the log( ) function to nega- tive values. The negative real numbers have a positive magnitude M and a phase angle φ of d, or any odd integer multiple of d. The circuit 100 using complex numbers require processing the real and imaginary parts separately and combining them.

The exponentiation operation performed on the complex number by, $$\exp(\log(M) + \sqrt{\{-1\}}\phi) = M\exp(\sqrt{\{-1\}}]\phi)$$

Since the real numbers are a subset of a set of complex numbers, the circuit 100 computes all functions computable with real-valued weights. In one example, the weights $v_{ki}$ chosen as complex-valued, and all other weights are main- tained as real. Each complex weight $v_{ki}$ can be expressed as, $$v_{ki} = v_{ki}^{Re} + \sqrt{-1}\,v_{ki}^{Im}$$

The second level processing units 104A-E obtains one or more second level inputs. The one or more second level inputs include the first level output ($y_1$ to $y_D$) of each first level processing unit. The outputs ($y_1$ to $y_D$) serve as the second level inputs to the second-level processing units 104A-E.

The second level processing units 104A-E include second level multiply-add (MA) units 110A-E and anti-log units 112A-E. The second level multiply-add (MA) units 104A-E compute a second level weighted sum 126A-E of the one or more second level inputs. The second level multiply-add (MA) units 104A-E multiply each second level input with the associated second level weight 124A-E to compute a second level product. The second level multiply-add (MA) units 104A-E subsequently compute a sum of the computed second level products to obtain second level weighted sum. The second level weighted sum is a weighted sum of the second level inputs. The second level weights associated with the second level inputs are all set to one to further optimize computational efficiency. The second level weighted sum of the k-th second level processing unit 104 that is denoted by $$net_k^2$$

is given by, $$net_k^2 =$$

$$\sum_{i=1}^{D} v_{ki} y_i = \sum_{i=1}^{D} v_{ki}\log\left(\sum_{j=1}^{n} u_{ij}x_j\right) = \sum_{i=1}^{D} \log\left(\sum_{j=1}^{n} u_{ij}x_j\right)^{v_{ki}} = \log\left(\prod_{i=1}^{D}\left(\sum_{j=1}^{n} u_{ij}x_j\right)^{v_{ki}}\right)$$

The circuit 100 incorporates the bias term into the sum- mation by using the first-level processing unit 102 that produces a constant output. The circuit 100 connects the first-level processing unit 102 to the k-th second-level processing unit 104 and assigns a weight to the connection that represents the bias. The circuit 100 then applies an algebraic simplification to simplify the expression (i.e., the logarithm of a product of terms is the sum of the logarithms of individual terms is an elementary property of the loga- rithm function).

The antilog units 112A-E are configured to compute a second level output 128A-E by performing an antilog opera- tion on the second level weighted sum. The antilog operation is referred to as an exponentiation. The second level output is a product of weighted polynomials of the first level inputs. This means the computation expresses complex, nonlinear relationships in a differentiable and interpretable form. The output of the k-th level output unit 104 is denoted by $z_k$ and is given by the base $$net_k^2,$$

where the "base" is the same base used in the logarithm unit 108. When the circuit 100 is implemented using digital hardware or VLSI, the base of the exponent to 2. In that case, the circuit 100 replaces base $$e^{net_k^2} \text{ by } 2^{net_k^2}.$$

This change does not significantly affect how the circuit 100 represents information since $$e^{net_k^2} = 2^{ln(2)\cdot net_k^2} \text{ and } 2^{net_k^2} = e^{log2(e)\cdot net_k^2}.$$

When the circuit 100 changes the base of the log, the circuit 100 multiplies the weighted sum by the constant. Equivalently, the circuit 100 multiplies each second-level weight by that constant. The circuit 100 computes the second-level output using the derived expressions for the second-level weighted sums by, $$z_k = \exp\left(\mathrm{net}_k^2\right) = \exp\left(\log\left(\prod_{i=1}^{D}\left(\sum_{j=1}^{n} u_{ij}x_j\right)^{v_{ki}}\right)\right)$$

$$z_k = \prod_{i=1}^{D}\left(\sum_{j=1}^{n} u_{ij}x_j\right)^{v_{ki}}, k = 1, 2, \ldots, E.$$

Each second-level processing unit generates its output by multiplying polynomial expressions of the first level inputs. The polynomial expressions are flexible because they are analytic functions, meaning they can be differentiated and analyzed. The polynomial functions of sufficiently high degree can approximate any continuous function to an arbitrary level of accuracy. Therefore, by selecting appropriate weights for the circuit's connections, the circuit 100 configures the output of the second-level processing unit 104 to approximate any desired function with required precision.

In some embodiments, the weights of the connections from the first level output to the k-th second level processing unit are all set to 1, i.e. $v_{ki}=1$, for i=1,2, ..., D. In this case, the second level output of the k-th second level processing unit is a product of degree one polynomials of the one or more first level inputs, and is given by $$z_k = \prod_{i=1}^{D}\left(\sum_{j=1}^{n} u_{ij}x_j\right)$$

When the weights $u_{ij}$ are allowed to be complex numbers, the individual degree one polynomial expressions $(u_{ij}x_j)$ are complex factors or roots of a single polynomial expression that represents $z_k$. When the output function $z_k$ is real, the factors $(u_{ij}x_j)$ exist as complex conjugates, or individual real terms.

In some embodiments, the weight $v_{ki}$ is a complex numbers given by $$v_{ki} = \left(v_{ki}^{Re} + \sqrt{-1}\, v_{ki}^{Im}\right),$$

where $$v_{ki}^{Re} \text{ and } v_{ki}^{Im}$$

are the real and imaginary parts of the complex number $v_{ki}$, respectively.

The second-level output of the second level processing unit 102A is a product of D terms, in which each term is a polynomial weighted by the complex number. In this case, the output of the k-th second level processing unit is given by $$z_k = \prod_{i=1}^{D}\left[\mathrm{net}_i^1\right]^{\left(v_{ki}^{Re}+\sqrt{-1}\,v_{ki}^{Im}\right)} = \prod_{i=1}^{m}\left[\mathrm{net}_i^1\right]^{v_{ki}^{Re}}\cdot\left[\mathrm{net}_i^1\right]^{\sqrt{-1}\,v_{ki}^{Im}} =$$

-continued $$\prod_{i=1}^{m}\left[\mathrm{net}_i^1\right]^{v_{ki}^{Re}}\cdot\left[\cos\left(v_{ki}^{Im}\log\left(\mathrm{net}_i^1\right)\right) + \sqrt{-1}\,\sin\left(v_{ki}^{Im}\log\left(\mathrm{net}_i^1\right)\right)\right]$$

In some embodiments, the weight $u_{ij}$ is a complex given by $$u_{ij} = \left(u_{ij}^{Re} + \sqrt{-1}\, u_{ij}^{Im}\right),$$

where $$u_{ij}^{Re} \text{ and } u_{ij}^{Im}$$

are the real and imaginary parts of the complex number $u_{ij}$, respectively.

In this case, $$z_k = \prod_{i=1}^{m}\left(\sum_{j=1}^{n} u_{ij}x_j\right)^{v_{ki}} = \prod_{i=1}^{m}\left(\sum_{j=1}^{n}\left(u_{ij}^{Re} + \sqrt{-1}\, u_{ij}^{Im}\right)x_j\right)^{v_{ki}}$$

i.e. the second level output of the k-th second level processing unit is a product of weighted complex trigonometric polynomials.

Because the closed-form and analytic expression for $z_k$ is analytic, the circuit 100 computes its derivatives and partial derivatives. Elementary algebra indicates that $$\frac{\partial z_k}{\partial x_r} = z_k \cdot \prod_{i=1}^{D}\frac{v_{ki}u_{ir}}{\sum_{j=1}^{n} u_{ij}x_j}$$

The circuit 100 performs a skip connection. Through performing the skip connection, the first level multiply-add (MA) units 106A-D multiply each first level input with the associated first level weight to compute a corresponding first level product. The first level multiply-add (MA) units 106A-D add the computed first level products to obtain the first level weighted sum. The first level weighted sum is the weighted sum of the first-level inputs. The logarithmic unit 108A-D is configured to compute a first level output by performing a logarithmic operation on the first level weighted sum. The first level output is the logarithm of the first-level weighted sum of the first level inputs. The differentiable functions can be computed by changing the weights associated with first level inputs.

The skip connection enhances a flexibility of the circuit 100 by allowing the second-level processing units 104A-E to access one or more second level inputs. The one or more second level inputs include at least one of (i) the one or more first level inputs $(x_1 x_2, \ldots, x_n)$ of each first level processing unit, (ii) the first level weighed sum $$\left(\mathrm{net}_1^1 \text{ to } \mathrm{net}_D^1\right)$$

of each first level processing unit and (iii) the first level output (denoted as $(y_1$ to $y_D)$ of each first level processing unit. This improves the computational power, allowing information to bypass intermediate layers for more expressive and stable outputs.

The weight of the connection from the i-th first level output ($y_i$) to the $k^{th}$ second level processing unit is $v_{ki}$, where k denotes destination unit's index and i index of the source. The first level input, when directly supplied to the second level processing units 104A-E without intermediate processing, is referred to as a skip connection, since it skips intermediate processing and is directly fed to the second level processing units 104A-E. The weight of the skip connection from the $j^{th}$ first level input ($x_j$) to the L-th second-level processing unit 104L is denoted by $$a_{L,j}^{2,1}.$$

Similarly, the first level weighted sum $$\text{net}_i^1$$

can be the second level input to the second level processing unit 102L through the skip connection. The weight of the skip connection from the i-th first level weighted sum $$\left(\text{net}_i^1\right)$$

to the L-th second level processing unit 104L is denoted by $$b_{L,i}^{2,1}.$$

The second level multiply-add (MA) units 104A-E compute a second level weighted sum of the one or more second level inputs. The second level multiply-add (MA) units 104A-E multiply each second level input with the associated second level weight to compute a second level product. The second level multiply-add (MA) units 104A-L add the computed second level products. The second level weighted sum is a weighted sum of the second level inputs. The second level weighted sum contains additional terms and is given by The second level weighted sum contains additional terms and is given by $$\text{net}_k^2 = \sum_{i=1}^{D} v_{ki} \log\left(\sum_{j=1}^{n} u_{ij} x_j\right) + \sum_{j=1}^{n} a_{kj}^{2,1} x_j + \sum_{i=1}^{D} b_{ki}^{2,1}\left(\sum_{j=1}^{n} u_{ij} x_j\right)$$

Which may be written as, $$\text{net}_k^2 = \sum_{i=1}^{D} \log\left(\sum_{j=1}^{n} u_{ij} x_j\right)^{v_{ki}} + \sum_{j=1}^{n} a_{kj}^{2,1} x_j + \sum_{i=1}^{D} b_{ki}^{2,1} \sum_{j=1}^{n} u_{ij} x_j =$$

$$\log\left(\prod_{i=1}^{D}\left(\sum_{j=1}^{n} u_{ij} x_j\right)^{v_{ki}}\right) + \sum_{j=1}^{n} a_{kj}^{2,1} x_j + \sum_{i=1}^{D} b_{ki}^{2,1} \sum_{j=1}^{n} u_{ij} x_j$$

The antilog units 112A-E are configured to compute a second level output by performing an antilog operation on the second level weighted sum. The skip connection of circuit produces a second level output that is a product of weighted polynomials of the first level inputs includes a product of (i) weighted polynomials of the one or more first level inputs and (ii) weighted exponentials of the one or more first level inputs and (iii) weighted exponentials of the one or more first level weighted sum of the first level processing units. The second level output is an interpretable and differentiable function, given by $$z_k = \exp\left(\text{net}_k^2\right) = \prod_{i=1}^{D}\left(\sum_{j=1}^{n} u_{ij} x_j\right)^{v_{ki}} \cdot \exp\left(\sum_{j=1}^{n} a_{kj}^{2,1} x_j\right) \cdot \exp\left(\sum_{i=1}^{D} b_{ki}^{2,1} \sum_{j=1}^{n} u_{ij} x_j\right)$$

The circuit 100 includes program instructions are configured to initialize the weights of the one or more first level inputs and the one or more second level inputs to compute the second level output corresponding to the one or more first level inputs. The program instructions are configured to update the weights of the one or more first level inputs and the one or more second level inputs using a training algorithm. The training algorithm is selected from one or more training algorithms to learn an input-output mapping function when the circuit dynamically receives input data. The program instructions are further configured to update the weights of the one or more first level inputs and the one or more second level inputs by (i) producing an expression corresponding to the second level output, and (ii) computing the derivatives or partial derivatives of desired orders of the second level output by using the expression corresponding to the second level output.

The circuit 100 computes the derivatives or partial derivatives not only with respect to the inputs but also with respect to intermediate outputs and weighted sums. The two-level processing units provide the gradient that does not vanish in any layer using the derivatives or partial derivatives. This results from using the log( ) function in the first level processing unit 102A-D and the exp( ) function in the second level processing unit 104A-E. These functions maintain non-negligible derivatives even large or small inputs, which ensures stable and efficient learning.

The circuit 100 provides a smooth and differentiable function that accurately captures its behavior and allows precise computation of sensitivities such as first-order partial derivative of gain with respect to temperature or component sizes. The circuit 100 enables reliable sensitivity analysis directly from simulated data. By fitting analytic functions to such data, the circuit 100 supports performance optimization in complex systems, including VLSI circuits, where gain varies with temperature and component dimensions.

The program instructions are further configured to determine an importance of the one or more first level inputs using the updated weights associated with the one or more first level inputs, removing near-zero weights assigned to at least one of the one or more first level inputs to improve efficiency and reduce overfitting, thereby the circuit automatically learns which first level inputs are more relevant during training. The circuit further includes a storage unit. The storage unit is configured to store (i) the first level inputs, first level weights, first level weighted sums, the first level output of each first level processing unit, and (ii) the second level inputs, second level weights, second level weighted sums, and the second level output of each second level processing unit. The program instructions are configured to initialize and modify weights of a first circuit (i . . . , the circuit 100) based on the weighted sums, the inputs, and the outputs of the first circuit and one or more second circuits.

The circuit 100 is configured to represent shapes and functions by using the weights of the first level, second level, and third level processing units. The circuit 100 is configured to identify similar shapes and functions by matching the weights corresponding to stored shapes and functions with the weights corresponding to shapes and functions in input data.

The third level outputs of the first circuit are fed to a second circuit as input. The first circuit encodes the first level inputs of the first circuit to produce the third level outputs to change a dimensionality of the input that is suitable for the second circuit. The second circuit is configured to decode the third level outputs of the first circuit to approximate or produce the first level inputs of the first circuit.

The circuit includes a control unit. The control unit is configured to orchestrate the program instructions of the circuit.

Figure 2:
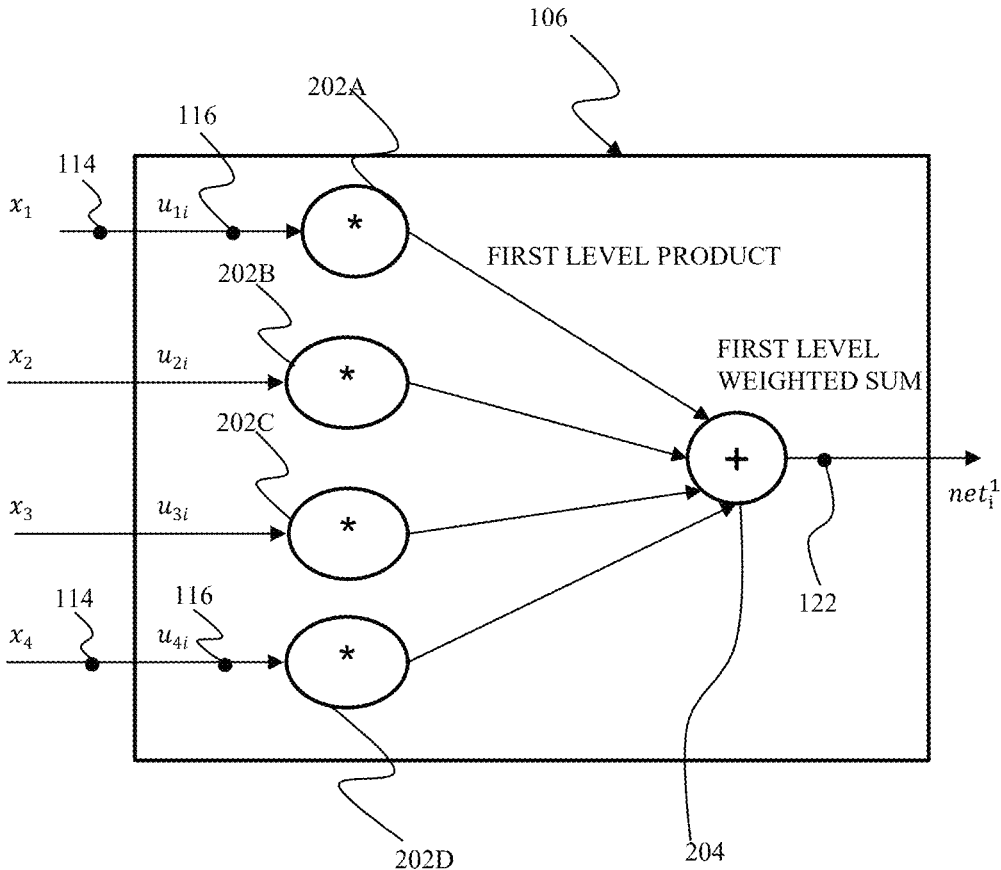
FIG. 2 is a block diagram that illustrates a function of first level multiply-add (MA) units according to some embodiments herein.

FIG. 2 is a block diagram that illustrates a function of first level multiply-add (MA) units 106A-D according to some embodiments herein. The first level multiply-add (MA) units 106A-D multiply each first level input $(x_1 x_2, \ldots, x_n)$ with the associated first level weight $(u_{ij})$ using multiplier 202A-D to compute a corresponding first level product. The first level multiply-add (MA) unit 106 adds the computed first level products to obtain the first level weighted sum using adder 204. The first level weighted sum is the weighted sum of the first-level inputs.

Figure 3:
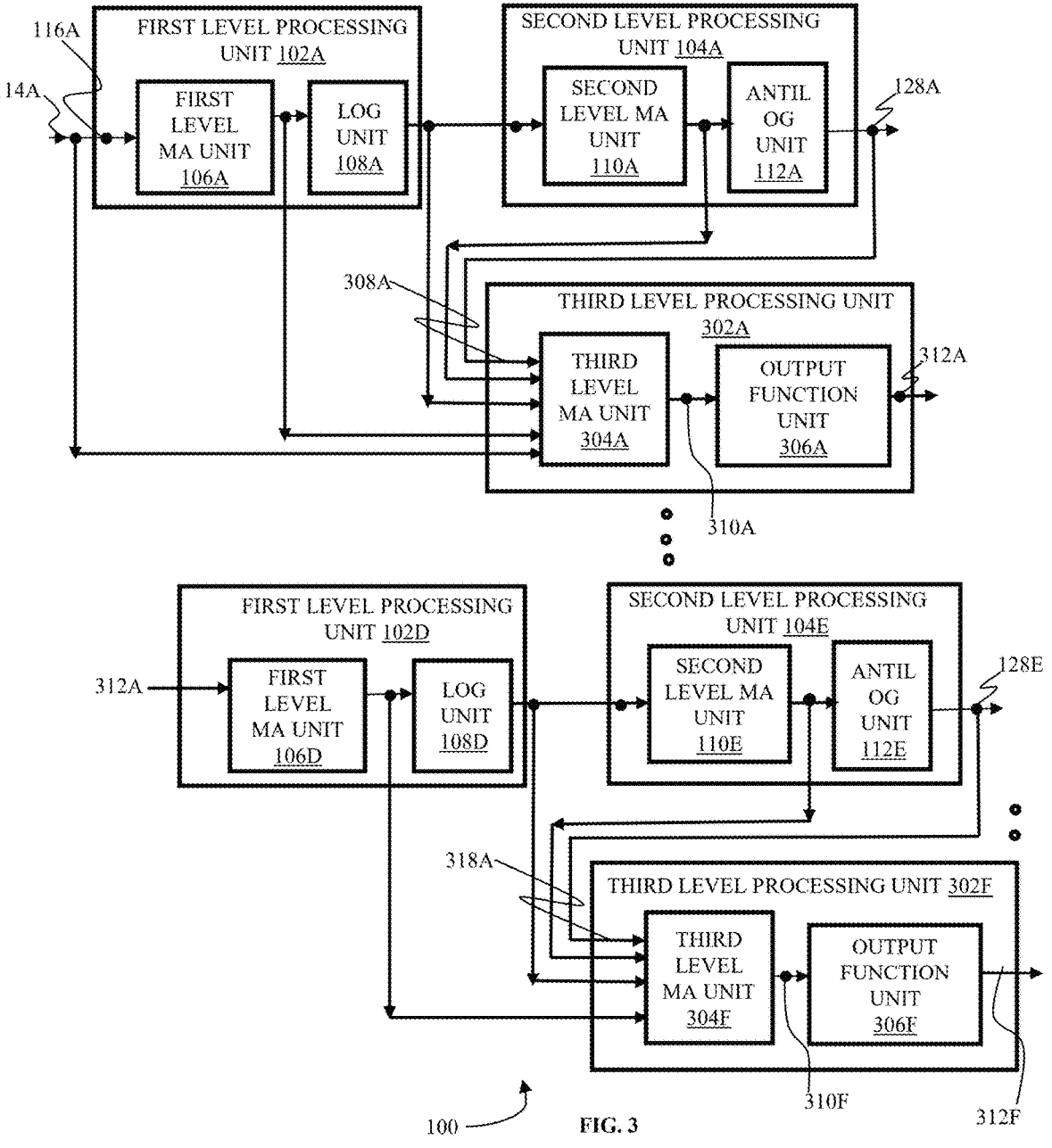
FIG. 3 is a block diagram that illustrates a circuit 100 includes three level processing units for efficiently performing operations on input data to compute an interpretable and differentiable function according to some embodiments herein.

FIG. 3 is a block diagram that illustrates a circuit 100 includes three level processing units for efficiently performing operations on input data to compute an interpretable and differentiable function according to some embodiments herein. The circuit 100 includes first level processing units 102A-D, second level processing units 104A-D, and third level processing units 302A-F. The first-level processing units 102A-D include first-level units 106A-D and log units 108A-D. The one or more second-level processing units 104A-E include second level MA units 110A-E and antilog units 112A-E. The one or more third-level processing units 302A-F include third level MA units 304A-F, and output function units 306A-F.

The first level processing units 102A-D obtain one or more first level inputs. Each first level input $(x_1 x_2, \ldots, x_n)$ is associated with its a corresponding first level weight $(u_{ij})$.

The first level processing units 102A-D include first level multiply-add (MA) units 106A-D and logarithmic units 108A-D. The first level multiply-add (MA) units 106A-D are configured to compute a first level weighted sum of the one or more first level inputs.

The first level multiply-add (MA) units 106A-D multiply each first level input with the associated first level weight to compute a corresponding first level product. The first level multiply-add (MA) units 106A-D add the computed first level products to obtain the first level weighted sum. The first level weighted sum is the weighted sum of the first-level inputs. The logarithmic unit 108A-D is configured to compute a first level output by performing a logarithmic operation on the first level weighted sum. The first level output is the logarithm of the first-level weighted sum of the first level inputs. Each of the first-level outputs is a function of a weighted combination of the input.

The second level processing units 104A-E obtain one or more second level inputs. The one or more second level inputs include the first level output of each first level processing unit. The outputs serve as inputs to the second-level processing units 104A-E. The second level weights associated with second level inputs are all set to one to further optimize computational efficiency.

The second level processing units 104A-E includes second level multiply-add (MA) units 110A-E and anti-log units 108A-E. The second level multiply-add (MA) units 104A-E compute a second level weighted sum of the one or more second level inputs. The second level multiply-add (MA) units 104A-E multiplies each second level input with the associated second level weight to compute a second level product. The second level multiply-add (MA) units 104A-E add the computed second level products. The second level weighted sum is a weighted sum of the second level inputs.

The antilog units 112A-E are configured to compute a second level output by performing an antilog operation on the second level weighted sum. The second level output is a product of weighted polynomials of the first level inputs.

The third level processing units 302A-F obtain one or more third level inputs, including the second level output of the at least one second level processing units. The third level input is associated with a third level weight 308A-F. When skip connections are present, the third-level inputs further include one or more of the first-level inputs $(x_1$ to $x_n)$, first-level weighted sums $$\text{net}_1^1, \text{net}_2^1, \ldots , \text{net}_D^1,$$

first-level outputs $y_1, y_2, \ldots , Y_D$, and the second-level weighted sums $$\text{net}_1^2, \text{net}_2^2, \ldots , \text{net}_E^2.$$

The weight of the connection from $x_j$ to the l-th third level processing unit is $$c_{ij}^{3,1}.$$

The weight of the connection from the first level weighted sum of the i-th first level weighted sum of i-th first level processing unit to the l-th third level processing unit is $$d_{li}^{3,1}.$$

The weight of the connection from the first level output of the i-th first level processing unit to the l-th third level processing unit is $$e_{li}^{3,1}.$$

The weight of the connection from the second level weighted sum of the i-th second level processing unit to the l-th third level processing unit is:

$$f_{li}^{3,2}.$$

By using skip connections, the third level processing units 302A-F access and obtain the third level inputs that includes the one or more first level inputs of each first level processing unit, the first level weighted sum of each first level processing unit, the first level output of each first level processing unit, the second level weighted sum of each second level processing unit, and the second level output of each second level processing unit.

The third level processing units 302A-F include the third level multiply-add (MA) unit 304A-F and output function units 306A-F. The third level multiply-add (MA) unit 304A-F is configured to compute a third level weighted sum 310A-F of the one or more third level inputs. The third level weighted sum is computed by multiplying each third level input with the associated third level weight to compute a third level product, and adding the computed third level products. The third level weighted sum is the weighted sum of the third level inputs.

The third level weighted sum at the l-th third level processing unit is given by, $$
net_l^3 = \sum_{k=1}^{E} w_{lk} \left[ \prod_{i=1}^{D} \left( \sum_{j=1}^{n} u_{ij} x_j \right)^{v_{ki}} \cdot \exp\left( \sum_{j=1}^{n} a_{kj}^{2,1} x_j \right) \cdot \exp\left( \sum_{i=1}^{D} b_{kj}^{2,1} \sum_{j=1}^{n} u_{ij} x_j \right) \right] +
$$

$$
\sum_{j=1}^{n} c_{lj}^{3,1} x_j + \sum_{i=1}^{D} d_{li}^{3,1} net_i^1 + \sum_{i=1}^{E} e_{li}^{3,1} y_i + \sum_{i=1}^{E} f_{li}^{3,2} net_i^2
$$

Which may be further expanded as, $$
net_l^3 = \sum_{k=1}^{E} w_{lk} \left[ \begin{array}{l} \prod\limits_{i=1}^{D} \left( \sum\limits_{j=1}^{n} u_{ij} x_j \right)^{v_{ki}} \\ \cdot \exp\left( \sum\limits_{j=1}^{n} a_{kj}^{2,1} x_j \right) \cdot \exp\left( \sum\limits_{i=1}^{D} b_{kj}^{2,1} \sum\limits_{j=1}^{n} u_{ij} x_j \right) \end{array} \right] + \sum_{j=1}^{n} c_{lj}^{3,1} x_j +
$$

$$
\sum_{i=1}^{D} d_{li}^{3,1} \left( \sum_{j=1}^{n} u_{ij} x_j \right) + \sum_{i=1}^{E} e_{li}^{3,1} y_i + \sum_{i=1}^{E} f_{li}^{3,2} net_i^2
$$

Which expands to, $$
net_l^3 = \sum_{k=1}^{E} w_{lk} \left[ \begin{array}{l} \prod\limits_{i=1}^{D} \left( \sum\limits_{j=1}^{n} u_{ij} x_j \right)^{v_{ki}} \\ \cdot \exp\left( \sum\limits_{j=1}^{n} a_{kj}^{2,1} x_j \right) \cdot \exp\left( \sum\limits_{i=1}^{D} b_{kj}^{2,1} \sum\limits_{j=1}^{n} u_{ij} x_j \right) \end{array} \right] +
$$

$$
\sum_{j=1}^{n} c_{lj}^{3,1} x_j + \sum_{i=1}^{D} d_{li}^{3,1} \left( \sum_{j=1}^{n} u_{ij} x_j \right) + \sum_{i=1}^{E} e_{li}^{3,1} \log\left( \sum_{j=1}^{n} u_{ij} x_j \right) +
$$

$$
\sum_{i=1}^{E} f_{li}^{3,2} \left[ \begin{array}{l} \log\left( \prod\limits_{i=1}^{D} \left( \sum\limits_{j=1}^{n} u_{ij} x_j \right)^{v_{ki}} \right) \\ + \sum\limits_{j=1}^{n} a_{kj}^{2,1} x_j + \sum\limits_{i=1}^{D} b_{ki}^{2,1} \sum\limits_{j=1}^{n} u_{ij} x_j \end{array} \right].
$$

The output function units 306A-F are configured to compute a third level output by performing an output function operation on the third level weighted sum. The third level output 312A-F is the output function operated on the third level weighted sum. The third level output is given by, $$
t_l = act\left(net_l^3\right)
$$

The third-level processing units are configured such that the output function $$
act\left(net_l^3\right)
$$

is a differentiable function suitable for training using gradient-based methods. The circuit 100 includes a storage unit. The storage unit is configured to store the third level inputs, third level weights, and the third level weighted sums. The circuit 100 includes program instructions. The program instructions are configured to (i) initialize the weights of the one or more first level inputs, the one or more second level inputs, and the one or more third level inputs to compute the third level output, and (ii) computing derivatives or partial derivatives of desired orders of the third level output by using the expression corresponding to the third level output. The circuit 100 includes a control unit that is configured to orchestrate the program instructions of the circuit. The program instructions are further configured to update the weights of the one or more first level inputs, the one or more second level inputs, and the one or more third level inputs by producing an expression corresponding to the third level output.

When no skip connections are present, the third-level inputs consist only of the second-level outputs. The skip connections include connections from first-level inputs to third-level processing units with weights $$
c_{lj}^{3,1},
$$

connections from first-level weighted sums to third-level processing units with weights $$
d_{li}^{3,1},
$$

connections from first-level outputs to third-level processing units with weights $$
e_{li}^{3,1},
$$

and connections from the second-level weighted sums to the third-level processing unit with weights $$
f_{li}^{3,2},
$$

Each of the first-level outputs is a function of a weighted combination of the input. The second-level processing units are configured to receive the first-level outputs and compute second-level outputs $z_1, z_2, \ldots, z_E$. Each second-level output is a function of a weighted combination of the first-level outputs. The third-level multiply-add (MA) unit is configured to compute a third-level weighted sum $$
net_l^3
$$

19 based on one or more third-level inputs. The third-level weighted sum $$net_l^3$$

is computed as $$net_l^3 = \sum_{k=1}^{E} w_{lk} z_k = \sum_{k=1}^{E} w_{lk} \prod_{i=1}^{D} \left( \sum_{j=1}^{n} u_{ij} x_j \right)^{v_{ki}}, l = 1, 2, \dots, F.$$

When no skip connections are present. Where the $u_{ij}$, $v_{ki}$, $w_{lk}$ weights are applied at the first, second, and third processing levels, respectively.

Bias terms, if any, are modeled as constant third-level inputs with corresponding weights equal to the bias values.

The output of each third-level unit is:

$$t_l = act(net_l^3) = act\left( \sum_{k=1}^{E} w_{lk} z_k \right) = act\left( \sum_{k=1}^{E} w_{lk} \prod_{i=1}^{D} \left( \sum_{j=1}^{n} u_{ij} x_j \right)^{v_{ki}} \right) l = 1, 2, \dots, F$$

Here, act( ) denotes the output or activation function applied to the weighted sum $$net_l^3.$$

For regression tasks, the activation function is linear or identity, such as:act(input)=inputoract(input)=gain·input For classification tasks, the activation function is often a sigmoid:

$$act(\text{input}) = \frac{1}{1 + \exp(-\lambda \cdot \text{input})},$$

where ë is a gain parameter. Large values of ë approximate a step function, yielding binary outputs (0 or 1). For multiclass classification with C classes, either one-vs-rest strategy may be employed, or Class probabilities are computed using individual sigmoid outputs followed by a softmax function, which provides a smooth, differentiable approximation to the max( ) function.

The third-level output function unit is configured to apply an output function act(·). to the third-level weighted sum to generate a third-level output $t_l$, l=1,2, . . . , F. The output function act(·) is an identity function or a linear function for regression tasks. The output function act(·) is a sigmoid function or a softmax function for classification tasks. The third-level output $t_l$ represents a function of polynomial expression involving input values, optionally, further comprising exponential or logarithmic terms depending on the use of the skip connections.

Even when the activation function is identity, the third-level output remains expressive, allowing representation of functions involving polynomial products, exponentials, and logarithms. These richer representations enable the smooth modeling of both slow and rapidly changing behaviors.

When the expressions for partial derivatives in the two-level neuron circuits with the skip connections are considered, the output at the second neuron circuit is

20

$$z_k = \exp(net_k^2) = \prod_{i=1}^{D} \left( \sum_{j=1}^{n} u_{ij} x_j \right)^{v_{ki}} \cdot \exp\left( \sum_{j=1}^{n} a_{kj}^{2,1} x_j \right) \cdot \exp\left( \sum_{i=1}^{D} b_{ki}^{2,1} \sum_{j=1}^{n} u_{ij} x_j \right)$$

$$z_k = \exp(\alpha_k(x)) \prod_{i=1}^{m} \left( \sum_{j=1}^{n} u_{ij} x_j \right)^{v_{ki}}, k = 1, 2, \dots, E$$

Where $\alpha_k(x)$ is a function associated with the k-th second level processing unit, that depends on the input variables and several parameters (i.e., learnable weights). It represents some transformation of the input. The skip connections are direct links that bypass one or more layer and feed input from an earlier layer directly to a later one. For example, instead of just passing data from layer 1→2→3, skip connections might also pass data directly from layer 1 to layer 3. The skip connections increase a flexibility of the neural network, allowing it to represent or learn a wider variety of functions. This flexibility makes training easier because the neural network has more paths (representations) to explore. The training of the neural network is used to find the lowest point in a very complex landscape using gradient descent. If there are many "good enough" solutions (minima), the neural network has a chance of landing in one of them. Thus, the skip connections improve the probability of learning the model, even when the training landscape is complicated.

In some embodiments, the circuit 100 replaces the antilog or exponential function (exp(input)) with (exp(−input)), so that the output decreases with increasing inputs.

In some embodiments, the circuit 100 replaces the antilog or exponential function (exp( ) with alternative functions. The replaced function is given by $$f(net) = \frac{1}{1 + \exp(\lambda \cdot net)}$$

The inclusion of the third level enables representation of complex functions that require deeper networks when implemented using conventional deep learning architectures. The circuit is configured to approximate functions, including but not limited to quadratic functions, trigonometric functions, and functions with high nonlinearity, using reduced circuit depth. The circuit structures also enable efficient approximations of widely used functions like sin (x), which is beneficial in hardware-constrained environments that rely on small lookup tables and interpolation.

For example, to demonstrate the utility of a third level, let's consider approximating the function sin (x) when x ranges from 0 to $\pi$. The Taylor series approximation using 2 terms $$\left( x - \frac{x^3}{3!} \right)$$

which has a R2 score of 0.24. The output or act( ) function for the third level circuit is as act(input)=input. When trained on samples of the target function, the three level circuit learnt the approximation $1.7x^{1.2}-0.84x^{1.8}$, which has a R2 score of 0.99. The approximation provided by the three level circuit is far more accurate than the Taylor series approximation.

Figure 4:
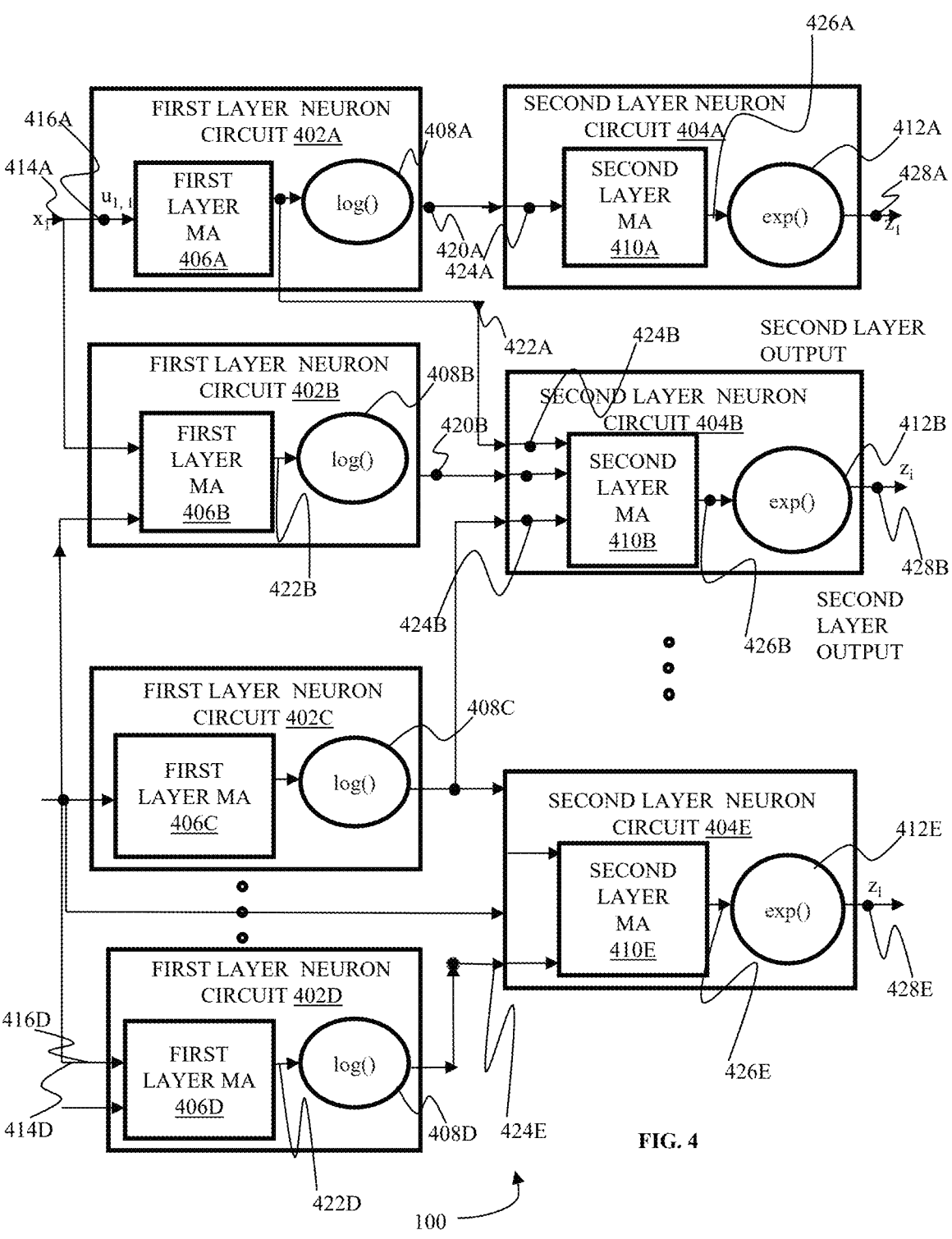
FIG. 4 is a block diagram that illustrates two-layer neuron circuit for efficiently performing operations on input data to compute an interpretable and differentiable function according to some embodiments herein.

FIG. 4 is a block diagram that illustrates two-layer neuron circuit for efficiently performing operations on input data to compute an interpretable and differentiable function according to some embodiments herein. The circuit 100 includes a first layer neuron circuit 402A-D and a second layer neuron circuit 404A-E. The first layer neuron circuit 402A-D includes first layer multiply-accumulate units 406A-D, and log function circuits 408A-D. The second layer neuron circuit 404A-E includes second layer multiply-accumulate units 410A-E and antilog function units 412A-E. The first layer neuron circuit that obtains one or more first layer inputs 414A-D. Each first layer input to each first layer neuron associated with a first layer weight 416A-D.

Each first layer neuron circuit is configured to (i) compute a first layer weighted sum by multiplying each first layer input with the associated first layer weight to compute a first layer product and adding the computed first layer products, and (ii) pass the first layer weighted sum through a logarithm activation function to produce a first layer neuron output 420A-D. The first layer weighted sum is a weighted sum of the first level inputs. The first layer output is the logarithm of the first layer weighted sum of the first layer input. The first layer neuron outputs are second layer inputs to the second layer neuron circuits.

The second layer neuron circuit that obtains at least one of second layer inputs, comprising the one or more first layer inputs of each first layer neuron circuit, the first layer weighted sum of each first layer neuron circuit, and the first layer output of each first layer neuron circuit. Each second layer input is associated with a second layer weight.

Each second layer neuron circuit is configured to (i) compute a second layer weighted sum by multiplying each second layer input with the associated second layer weight to compute a second layer product, and adding the computed second layer products, and (ii) pass the second layer weighted sum through an antilog activation function to produce a second layer neuron output.

The second layer output comprises a product of (i) weighted polynomials of the one or more first layer inputs (ii) the weighted exponentials of the first layer inputs, and (iii) weighted exponentials of the first layer weighted sums.

For example, to illustrate the two layer neural network, consider a neural network with 6 inputs $x_1, x_2, \ldots, x_6$. There are 2 neurons in the first layer of the neural network. Neuron 1 in the first layer receives as inputs $x_1$, $x_2$, and $x_3$, with associated weights of 1, 3, and 5; this is equivalent to having all 6 inputs $x_1, x_2, x_3, x_4, x_1, x_5$ and $x_6$ with weights 1, 3, 5, 0, 0, and 0, respectively. First layer neurons have log( ) activation functions. The second neuron in the first layer receives as inputs $x_4, x_5,$ and $x_6$, with associated weights of 2,–4, and 6; this is equivalent to having all 6 inputs $x_1, x_2, x_3, x_4, x_1, x_5$ and $x_6$ with weights 0, 0, 0, 2, –4, and 6, respectively. The second layer has only one neuron. The outputs of first layer neurons 1 and 2 are connected to the layer 2 neuron with weights of 2 and –3, respectively. The second layer neuron has an exponential or exp( ) activation function. The output of neuron 1 (i.e. y_1) and neuron 2 (y_2) in the first layer are given by $$y_1 = \log(x_1 + 3x_2 + 5x_3)$$

and $$y2 = \log(2x_4 - 4x_5 + 6x_6)$$

The two first layer neuron outputs are inputs to the second layer neuron. The second layer weighted sum for the second layer neuron is given by $$net_1^2 = 2y_1 - 3y_2$$

and the second layer output of the second layer neuron is given by $$z_1 = \exp\left(net_1^2\right) = \exp(2y_1 - 3y_2) =$$

$$\frac{\exp(2y_1)}{\exp(3y_2)} = \frac{(x_1 + 3x_2 + 5x_3)^2}{(2x_4 - 4x_5 + 6x_6)^3} = (x_1 + 3x_2 + 5x_3)^2 \cdot (2x_4 - 4x_5 + 6x_6)^{-3}$$

Let's assume the above weights associated with the inputs are real numbers. When implemented in software or on hardware, these weights may be represented by fixed precision or as floating-point numbers.

The circuit 100 selects a training algorithm to compute the weights of the circuit used in the two-layer neural network, using the first layer inputs and the second layer inputs obtained for training the neural network. The circuit executes the selected training algorithm. The circuit 100 uploads the weights associated with the one or more first layer inputs and the one or more second layer inputs into the circuit using the program instructions, wherein the program instructions are defined for inferencing. The circuit 100 generates, by the two-layer neural network, the second level output using the updated weights learned by the selected training algorithm.

The two-layer neural network capable of inferencing and learning the weights of the one or more first layer inputs of each first layer neuron circuit, the weights of the one or more second layer inputs of each second layer neuron circuit, and the second layer output of each second layer neuron circuit.

In an example embodiment, the circuit 100 process a set of 50,000 training images from the CIFAR-10 dataset as input to a first three level circuit 3LC1. Each image is 32×32 pixels in size with three color channels, red, green, and blue (RGB). The circuit divides each image into 4×4 patches, i.e. of 16 pixels each. Each image is thus broken up into $$\frac{32}{4} * \frac{32}{4} = 64 \text{ patches.}$$

Each patch contains 16 pixels, and with 3 channels per pixel, this results in 48 input values per patch, i.e., an input dimensionality of 48.

The 3LC1 circuit includes 100, 16, and 10 processing units in its first, second, and third levels, respectively. The 3LC1 effectively reduces the input dimensionality from 48 to 10. The output of 3LC1 is then passed to a second three-level circuit, 3LC2, which consists of 100, 16, and 48 processing units in its three levels. The output dimensionality of circuit 3LC2 is the same as the dimensionality of the inputs to the first circuit 3LC1. The combination of the two circuits 3LC1 and 3LC2 is trained by using the back-propagation algorithm for 100 epochs with a batch size of 300 images. The circuit calculates reconstruction errors as the mean squared error (MSE) between the original and reconstructed test images averages 0.0019 per batch of 100 images. This low reconstruction error indicates that 3LC1 effectively compress the input data from 48 to 10 dimensions while preserving most of the essential information, allowing 3LC2 to accurately reconstruct the original input from the compressed representation.

In some other embodiments, the two layer neural network with D neurons in layer 1 and one neuron in layer 2, not using any skip connections, is configured with all weights connecting first layer outputs to the second layer neuron being fixed at 1. In this case, the output of the second layer neuron is given by $$z_1 = \prod_{i=1}^{D} \left( \sum_{j=1}^{n} u_{ij} x_j + \theta_i \right)$$

where the bias term $\theta_i$ has been explicitly included. The weights $u_{ij}$ and the bias terms $\theta_i$ are complex valued, while the values of $z_1$ are chosen to be real, corresponding to a real valued polynomial. The form of $z_1$ is that of a polynomial composed of a product of roots, since $z_1=0$ if any of the terms $$\left( \sum_{j=1}^{n} u_{ij} x_j + \theta_i \right)$$

is zero. When the network is trained using samples of a known (or unknown) function, the network learns weights $u_{ij}$ (i=1, 2, . . . , D; j=1, 2, . . . , n), and $\theta_i$ (i=1, 2, . . . , D) from which the roots of the polynomial corresponding to $z_1$ are determined.

As an example, embodiment, consider the function $$f(x) = x^4 - 19x^3 + 121x^2 - 309x + 270$$

which represents a fourth-order polynomial in a single variable x, with at most four roots. The two-level circuit receives a plurality of input-output sample pairs $(x, f(x))$, where $f(x)$ is a univariate polynomial function of degree n. The two-level circuit trains a neural network with four neurons in layer 1, and one neuron in layer 2. The circuit further constrains weights of all connections from layer 1 outputs to the second layer neuron to be equal to 1. The two level circuit trains the neural network that includes two layers using the input-output sample pairs, by (i) constraining weights in layer 1 of the two-layer neural network to be real-valued, and (ii) training is performed by minimizing a mean squared error between actual output values $f(x)$ and predicted output values produced by the neural network. The two-layer neural network is configured, upon completion of training, to approximate the polynomial function $f(x)$. The two-layer neural network is trained using 1000 input-output sample pairs, over 30,000 dataset training epochs, by minimizing the mean squared error between the actual and predicted sample values across the training dataset. The circuit obtains the trained weights and bias terms from the two-layer neuron network.

The first layer weights and bias terms of the trained neural network are used to obtain an interpretable function corresponding to the polynomial function learnt by the neural network, which is given by (approximating weights to 2 decimal places)

$$z_1 = 1.0(3.16 - 1.57x)^{1.0}(4.54 - 0.91x)^{1.0}(0.51x - 4.53)^{1.0}(1.37x - 4.23)^{1.0}$$

If any of the four expressions enclosed in parentheses $(z_1)$ evaluates to zero, the overall output $f(x)$ becomes zero. Accordingly, the roots of the function are determined by the conditions under which these individual terms equal zero.

The roots of function given by, x=8.934, 3.077, 4.978, and 2.01, which are close to the true roots of the equation used to generate the data, viz. x=9, 3, 5, and 2.

In yet other embodiments, the circuit 100 configures the two layer neural network with D neurons in layer 1 comprising two groups of D1 and D2 neurons, respectively, and one neuron in layer 2. The neural network does not use any skip connections, and is configured with all weights connecting first layer outputs of the first group of D1 layer 1 neurons to the second layer neuron being fixed at 1, and with all weights connecting first layer outputs of the second group of D2 layer 1 neurons to the second layer neuron being fixed at 1. In this case the output of the second layer neuron is given by $$z_1 = \frac{\prod_{i=1}^{D1} \left( \sum_{j=1}^{n} u_{ij} x_j + \theta_i \right)}{\prod_{i=1}^{D2} \left( \sum_{j=1}^{n} u_{ij} x_j + \theta_i \right)}$$

The circuit 100 chooses the weights $u_{ij}$ and the bias terms $\theta_i$ to be complex valued. The values of $z_1$ are required to be real, corresponding to a real valued polynomial. In this case, circuit 100 determines $z_1$ as a rational function in the form of a numerator consisting of a product of zeros and the denominator consisting of a product of poles.

n some embodiments, the circuit 100 receives, as input, training data representing values for a mathematical function defined by $f(x)=x^3-1$.

The two-layer neural network includes a first layer having three neurons with complex-valued weights associated with each input and a second layer having a single neuron, with each incoming weight from the first layer fixed at a value of 1. The circuit trains the neural network using 1000 training data over 15,000 epochs to approximate the function $f(x)$. The circuit 100 generates, from the trained network, an approximant function that is given by $$z_1 = 1.0\left(1.0x - 0.9999 + 1.1239 \cdot 10^{-6} i\right)^{1.0} \cdot$$

$$(1.0x + 0.4999 - 0.8660i)^{1.0} \cdot (1.0x + 0.4999 + 0.8660i)^{1.0}$$

where i denotes $\sqrt{-1}$. The roots are then given by values of x at which $z_1=0$, i.e.

$$x = 1, -0.4999 - 0.866 \cdot i, -0.4999 + 0.866 \cdot i$$

These are very close to the exact roots, which are the cube roots of unity, that are given by, $$x = 1, -\frac{1}{2} + \frac{\sqrt{3}}{2} \cdot i, -\frac{1}{2} + \frac{\sqrt{3}}{2} \cdot i$$

In yet other embodiments, the circuit 100 configures the two layer neural network with D neurons in layer 1 comprising two groups of D1 and D2 neurons, respectively, and one neuron in layer 2. The neural network does not use any skip connections, and is configured with all weights connecting first layer outputs of the first group of D1 layer 1 neurons to the second layer neuron being fixed at 1, and with all weights connecting first layer outputs of the second group of D2 layer 1 neurons to the second layer neuron being fixed at 1. In this case the output of the second layer neuron is given by $$z_1 = \frac{\prod_{i=1}^{D1} \left( \sum_{j=1}^{n} u_{ij} x_j + \theta_i \right)}{\prod_{i=1}^{D2} \left( \sum_{j=1}^{n} u_{ij} x_j + \theta_i \right)}$$

The circuit 100 chooses the weights $u_{ij}$ and the bias terms $\theta_i$ to be complex valued. The values of $z_1$ are required to be real, corresponding to a real valued polynomial. In this case, circuit 100 determines $z_1$ as a rational function in the form of a numerator consisting of a product of zeros and the denominator consisting of a product of poles.

Figure 5:
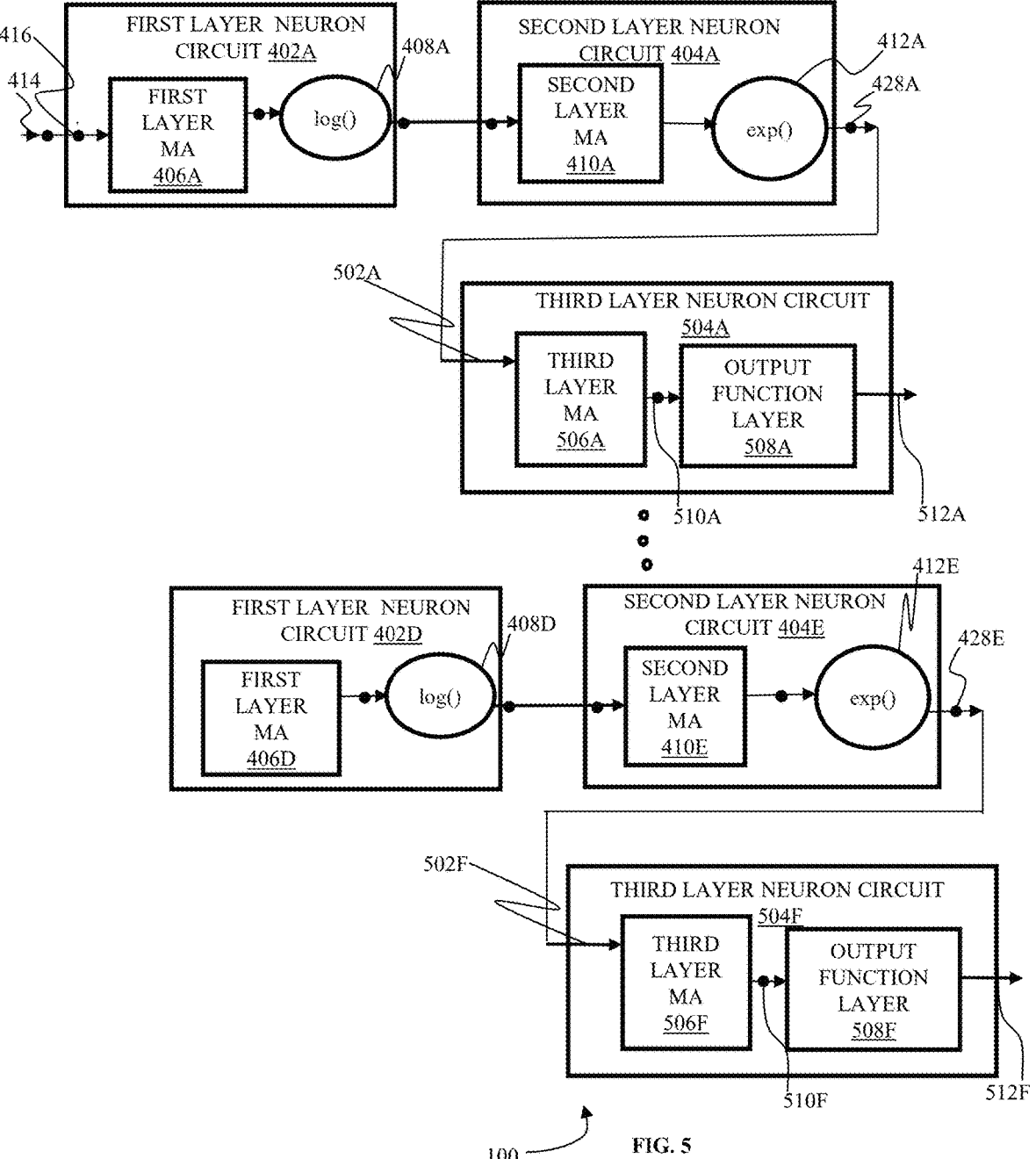
FIG. 5 is a block diagram that illustrates a circuit implemented as a three-layer neural network according to some embodiments herein.

FIG. 5 is a block diagram that illustrates a circuit implemented as a three-layer neural network according to some embodiments herein. The circuit 100 includes a first layer neuron circuit 402A-D, a second layer neuron circuit 404A-D and a third layer neuron circuit 504A-F. The first layer neuron circuit 402A-D includes first layer MA 406A-D, and log function 408A-D. The second layer neuron circuit 404A-M includes second layer MA 410A-E and antilog function 412A-E. The first layer neuron circuit that obtains one or more first layer inputs. Each first layer input is associated with a first layer weight. The third layer neuron circuit 504A-F includes third layer MA 506A-F and output function layer 508A-F.

Each first layer neuron circuit is configured to (i) compute a first layer weighted sum 422A-D by multiplying each first layer input with the associated first layer weight to compute a first layer product and adding the computed first layer products, and (ii) pass the first layer weighted sum through a logarithm activation function to produce a first layer neuron output. The first layer weighted sum is a weighted sum of the first level inputs. The first layer output is the logarithm of the first layer weighted sum of the first layer input.

The second layer neuron circuit that obtains at least one of second layer inputs, comprising the one or more first layer inputs of each first layer neuron circuit, the first layer weighted sum of each first layer neuron circuit, and the first layer output of each first layer neuron circuit. Each second layer input is associated with a second layer weight 424A-E.

Each second layer neuron circuit is configured to (i) compute a second layer weighted sum 426A-E by multiplying each second layer input with the associated second layer weight to compute a second layer product, and adding the computed second layer products, and (ii) pass the second layer weighted sum through an antilog activation function to produce a second layer neuron output 428A-E.

The second layer output comprises a product of (i) weighted polynomials of the one or more first layer inputs, (ii) the weighted exponentials of the first layer inputs, and (iii) weighted exponentials of the first layer weighted sums.

The third layer neuron circuit that obtains at least one of third layer input, comprising the one or more first layer inputs of each first layer neuron circuit, the first layer weighted sum of each first layer neuron circuit, the first layer output of each first layer neuron circuit, the second layer output of each second layer processing unit, the second layer weighted sum of each second layer neuron circuit, and the second layer output of each second layer neuron circuit.

Each third layer neuron circuit is configured to (i) compute a third layer weighted sum 510A-F by multiplying each third layer input with an associated third layer weight

508A-F to compute a third layer product and add the computed third layer products, and (ii) produce a third layer output 512A-F by passing the third layer weighted sum through an output activation function, wherein the third layer output is the output activation function applied on the third layer weighted sum.

The circuit 100 selects a training algorithm to compute the weights of the circuit used in the three-layer neural network, using the first layer inputs, the second layer inputs, the third layer inputs, the first layer outputs, the second layer outputs, and the third layer outputs obtained for training the neural network. The circuit executes the selected training algorithm.

The circuit uploads the weights associated with the one or more first layer inputs, the weights associated with one or more second layer inputs, and the weights associated with one or more third layer inputs into the circuit using the program instructions, wherein the program instructions are defined for inferencing. The circuit generates, by the three-layer neural network, the third layer outputs using the updated weights learned by the selected training algorithm.

Figure 6:
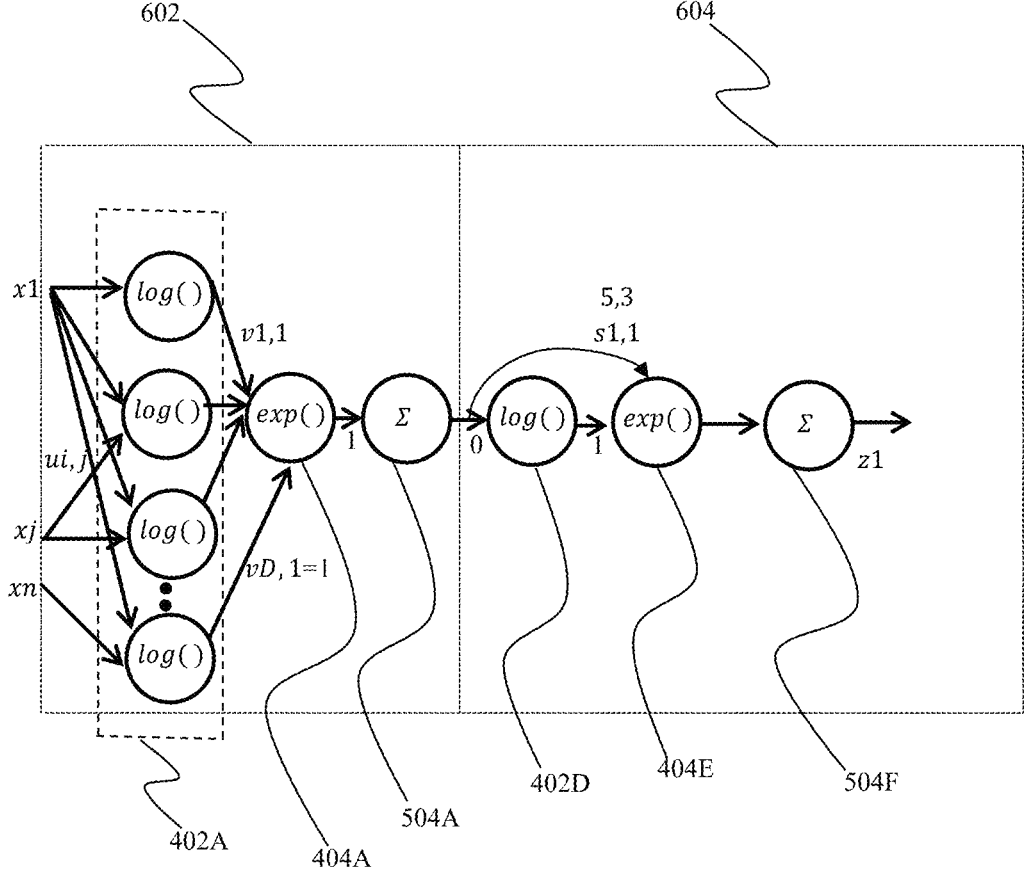
FIG. 6 is a block diagram of an example of a multi-circuit neural architecture with skip connections, according to some embodiments herein.
Figure 6:
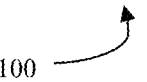

FIG. 6 is a block diagram of an example of a multi-circuit neural architecture with skip connections, according to some embodiments herein. The multi-circuit neural architecture may be two three-layer neuron circuits. The two three-layer neuron circuits include a first-circuit 602 and a second circuit 604. Each circuit includes one or more layer neuron circuits. The first layer neuron circuit of the first circuit includes four neurons. The second layer neuron circuit of the first circuit includes a single neuron. The third layer neuron circuit of the first circuit includes a single neuron.

The first layer neuron circuit of the second circuit includes a single neuron. The second layer neuron circuit of the first circuit includes a single neuron. The third layer neuron circuit of the first circuit includes a single neuron. The first layer neuron circuit of the first circuit is configured to receive one or more inputs or input features. Each neuron in the second and third layers is configured with a linear activation function such that $$act(\text{input}) = \text{input}.$$

The two three-layer neuron circuits include at least one skip connection configured to transmit an output from the third layer neuron of the first circuit, to the second layer neuron of the second circuit, such that the skip connection effectively spans multiple logical layers of the overall network architecture.

The skip connection is configured to provide a direct connection from at least one input to the second-layer of the second neuron circuit, bypassing the first-layer of the second neuron circuit. The weight of this skip connection is denoted by $$s_{1,1}^{5,3},$$

since it connects neuron 1 (source index) in layer 3 to neuron 1 (destination index) in layer 2 of the second circuit (which is layer 5 of the overall neural network).

The multi-circuit neural architecture includes an output function that is configured to compute an output of the third-layer of the second neuron circuit. The output function is the activation function act( ) of the third layer neuron of the second neuron circuit, and is chosen to be an identity function, i.e. act(input)=input. The output of the second neuron circuit is an exponentiated product of polynomial expressions, including Gaussian functions or Gaussian mixtures of polynomials in the input, where the degrees of the polynomials are determined by selecting weights of second layer inputs of the first neuron circuit ($v_{k1}$).

The multi-circuit neural architecture processes the input through the first layer neuron circuit. Each layer performs weighted computations on its inputs to generate corresponding outputs. The output includes a weighted sum of products of polynomial expressions of the input variables. The output of at least one neuron in the third layer of the second neuron circuit is represented as an exponentiated product of polynomial expressions of the input features and skip-connected outputs, and is computed as, $$z_1 = \exp\left[s_{1,1}^{5,3} \cdot \prod_{i=1}^{D}\left(\sum_{j=1}^{n} u_{1j}x_j\right)^{v_{k1}}\right]$$

Where $$s_{1,1}^{5,3}$$

represents a weight on a skip connection from the third layer neuron circuit of the first circuit to the second layer neuron circuit of the second circuit, $u_{1j}$ are weights applied to input features.

The multi-circuit architecture represents a larger class of functions with high accuracy using a small number of neurons and weights. Table I shows the accuracy attained by different trained architectures: The three layer circuit (denoted by 3LC), a two layer circuit (2LC), and a multi-circuit architecture comprising two 3 layer circuits (2×3LC). Also provided in the table are comparisons with linear regression and Support Vector Regression (SVR). The performance metric used for comparing different methods is the $R^2$ score. Table I indicates that the single and multi-circuit architectures provide state of the art performance on the chosen functions.

TABLE I

| TABLE I: Comparison of $R^2$ Scores for different models on various target functions | | | | | |
|---|---|---|---|---|---|
| Target Function | Linear Reg | SVR | 3LC | 2LC | 2 × 3LC |
| $y = x^7 + 4x^3 + 3$ | 0.69 | 0.54 | 0.9997 | 0.9999 | 0.9960 |
| $y = \sin(x)$ | 0.90 | 0.984 | 0.9711 | 0.8050 | 0.9999 |
| $y = e^{\frac{x}{3}}$ | 0.9836 | 0.9930 | 0.9999 | 0.9993 | 0.9999 |
| $y = e^{x^2-3x+2}$ | 0.4073 | 0.5942 | 0.9988 | 0.9972 | 0.9980 |
| $y = \frac{m_1 m_2}{r^2}$ | 0.6764 | 0.6636 | 0.9800 | 0.7237 | 0.9852 |
| $y = \frac{1}{2}mv^2$ | 0.8789 | 0.7174 | 0.9999 | 0.9999 | 0.9998 |

Table II shows the number of weights used by 3LC, 2LC, and 2×3LC models, including one bias per neuron. The results indicate that even very small networks can accurately approximate complex functions with high efficiency.

The 2×3LC consistently attains higher R2 values, confirming that greater representational power enhances the model's ability to fit the data effectively.

TABLE II

| Target Function | 3LC | 2LC | 2 × 3LC |
|---|---|---|---|
| $y = x^7 + 4x^3 + 3$ | 29 | 18 | 47 |
| $y = \sin(x)$ | 11 | 15 | 47 |
| $y = e^{\frac{x}{3}}$ | 29 | 18 | 47 |
| $y = e^{x^2-3x+2}$ | 29 | 18 | 47 |
| $y = \frac{m_1 m_2}{r^2}$ | 37 | 30 | 51 |
| $y = \frac{1}{2}mv^2$ | 33 | 24 | 49 |

Table III compares 3LC on complex target functions, showing that the 3LC finds superior approximations with only one-tenth the number of weights compared to existing deep neural networks. The performance metric used for comparing the accuracies of different methods is the Mean Squared Error (MSE). Comparisons have been provided with a standard deep neural network.

TABLE III

| | MSE | | No. of parameters | |
|---|---|---|---|---|
| Target Function | NN NN | 3LC 3LC | NN NN | 3LC 3LC |
| $y = -8x_1 + (5e^{-6})(1 - e^{2x_2+2x_3}) + 2x_4^2$ | 1.1337 | 0.7654479 | 1110 | 161 |
| $y = -8x_1^2 + e^{-6}\frac{2x_2}{2x_3} + e^{-6}(2x_4)(7x_5)$ | 1.2374 | 0.6162332 | 1245 | 171 |

The circuit is configured to represent and learn a class of functions, including, but not limited to, Gaussians, Gaussian mixtures, and exponentials of products or sums of polynomial functions in the input features, by using only two three-layer neuron circuits.

The training of the circuit is performed by minimizing a loss function selected from regression or classification objectives, and includes backpropagation of gradients and updates to the weights in the two three-layer neuron circuits.

In classification, the two-layer neural network determines the class of an input by comparing its second-layer output to a threshold. For binary classification, a positive output may indicate class 1, and a negative output class 0 (or −1). In multi-class classification, the output layer has multiple neurons, each corresponding to one class. The activation function of the output layer neurons is a smooth function, e.g. a sigmoid function. The outputs of the sigmoid functions of all output neurons are fed to a softmax function to determine the probability of the input belonging to a class. During training, the threshold is replaced with a differentiable function, such as the sigmoid or tanh, and a loss function like cross-entropy is used. The circuit propagates gradients backward using backpropagation to update the weights of the two three-layer neuron circuits.

Table IV shows classification performance on different benchmark datasets. Comparisons are provided with some standard methods. ELM refers to the Extreme Learning Machine. RBFNN refers to a Radial Basis Function (RBF) neural network.

TABLE IV

| Classification Performance. | | | | |
|---|---|---|---|---|
| problem | ELM | RBFNN | 3LC | 2LC |
| balance-scale | 91.8 | 89.6 | 96.223743 | 90.445859 |
| breast-cancer-wisc-prog | 82.7 | 76.2 | 82.833333 | 78 |
| breast-tissue | 70.2 | 66.9 | 78.395062 | 75.308641 |
| congressional-voting | 61.2 | 61.3 | 64.453016 | 65.454545 |
| credit-approval | 86.6 | 82.6 | 86.946050 | 83.236994 |
| glass | 69.3 | 65.8 | 71.450617 | 71.604938 |
| heart-cleveland | 58.6 | 55.7 | 66.015892 | 62.719298 |
| heart-hungarian | 82.5 | 80.6 | 86.036036 | 84.684684 |

Figure 7:
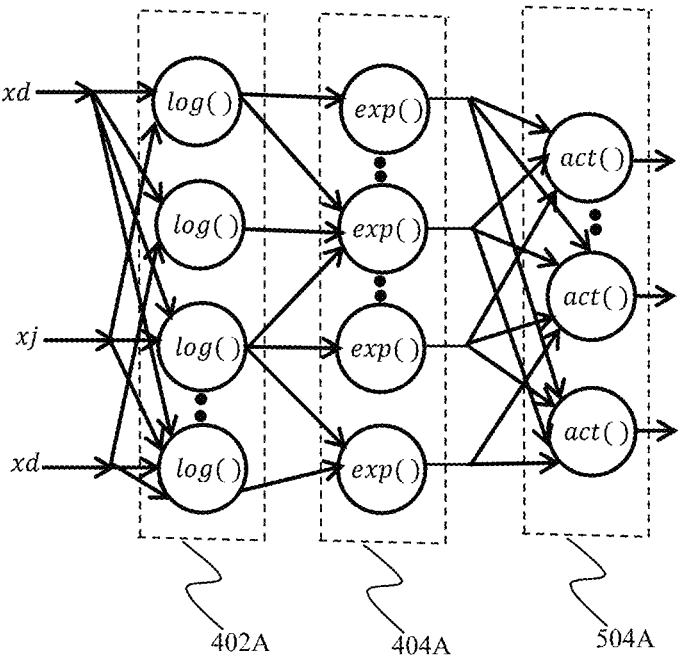
FIG. 7 is an example implementation of two three-layer neural network configured for feature selection, according to some embodiments herein.
Figure 7:
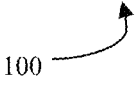

FIG. 7 is an example implementation of two three-layer neural network configured for feature selection, according to some embodiments herein. The two three-layer neural network 602 and 604 includes a first layer neuron circuit, a second layer neuron circuit, and a third layer neuron circuit. The first layer neuron circuit 402A includes one or more log function neurons. The second layer neuron circuit 404A includes one or more antilog function neurons. The third layer neuron circuit 504A includes an activation function or output function. The first layer neuron circuit 402A receives an input, or input vector or tensor. The input is derived from speech, image, audio, video, or other data. The inputs are passed through an additional diagonal layer of weights before they are available as the first layer inputs to the first layer neuron circuit.

The circuit 100 initializes the initial diagonal weight matrix, such that each weight corresponds to a respective feature of the input vector. This ensures that only individual input features are weighted, without mixing them. The two three-layer neural network 602 and 604 assign higher weights to important features while suppressing unimportant ones. The circuit selects a subset of top-ranked input features by evaluating the magnitude of the diagonal weights. The circuit trains the neural network using only the selected subset of input features to perform a classification or regression task.

In another implementation, the three-layer neural network is configured for feature extraction, according to some embodiments herein. The three-layer neural network includes a first layer neuron circuit, a second layer neuron circuit, and a third layer neuron circuit. The first layer neuron circuit includes one or more log function neurons. The second layer neuron circuit includes one or more antilog function neurons. The third layer neuron circuit includes an activation function or output function. The first layer neuron circuit receives an input, or input vector or tensor. The input is derived from speech, image, audio, video, or other data. The inputs are passed through an additional non-diagonal layer of weights before they are available as first layer inputs to the first layer neuron circuits. The weights of the first layer neurons are diagonal, so that each first layer neuron receives a weighted mixture of all inputs.

The additional layer of weights corresponds to a rectangular weight matrix. The circuit initializes the initial layer corresponding to a rectangular weight matrix, such that each output of this layer corresponds to a mix of input features of the input vector. This ensures that each input to the first layer of the neural network is a weighted mix of the original inputs. The circuit selects a subset of top-ranked mix of features by evaluating the magnitude of the diagonal weights of the input layer of neurons. The circuit trains the neural network using only the selected subset of mix of features to perform a classification or recognition task.

Table V shows improved performance across datasets for selecting the top 10 features. The three-layer neuron circuit (3LC) is used for the classification of each dataset. The table shows that the 3 layer circuit selects 10 suitable features so that accuracy improves against using all features.

TABLE V

| Dataset | ELM kernel | RBFNN | 3LC using All Features | 3LC using Top 10 Features | Total No. of Features |
|---|---|---|---|---|---|
| breast-cancer-wisc-diag | 96.1 | 95.2 | 97.3 | 98.4 | 30 |
| cardiotocography-3clases | 92.7 | 85.9 | 91.0 | 92.4 | 21 |
| sonar-mines-rocks | 90.4 | 84.1 | 83.5 | 99.5 | 60 |
| cylinder-bands | 73.6 | 69.5 | 66.9 | 80.9 | 35 |
| dermatology | 96.7 | 96.4 | 96.3 | 98.1 | 34 |
| flags | 51.0 | 44.3 | 52.04 | 93.3 | 28 |
| ionosphere | 94.0 | 90.5 | 93.9 | 96.9 | 33 |
| libras | 84.7 | 79.1 | 68.8 | 91.9 | 90 |
| low-res-spect | 90.2 | 85.6 | 90.8 | 92.3 | 100 |
| lung-cancer | 37.5 | 59.3 | 58.4 | 100.0 | 56 |
| molec-biol-promoter | 86.5 | 84.9 | 93.3 | 100.0 | 57 |
| parkinsons | 94.4 | 83.5 | 94.4 | 96.4 | 22 |
| primary-tumor | 52.7 | 26.3 | 52.7 | 54.2 | 17 |
| statlog-heart | 86.9 | 82.2 | 88.2 | 95.9 | 13 |

The Extreme Learning Machine (kernel version) and a Radial Basis Function Neural Network (RBFNN) are other methods for which results are included in the table for comparison.

In some embodiments, the circuit minimizes norm of the weight matrix during training of the neural network by dividing a high-dimensional input into identically sized patches using encoding layer, applying a shared transformation across all patches to obtain lower-dimensional representations by computing outer products between embeddings of the identically sized patches using two attention layers, and processing the lower-dimensional representations to compute context-weighted representations of the patches using two feedforward neural network layers. The neural network may be a transformer. The transformer neural network includes, each transformer stage includes the encoding layer, two attention layers, and two feedforward neural network layers. The recognition task is performed on the dataset using the transformer neural network. each transformer stage consists of five layers. The representational capacity of the transformer can be enhanced by using multiple attention heads (parallel attention mechanisms), and stacking multiple stages.

In some embodiments, the recognition task is performed by two circuits of three-layer neural networks each. The architecture consists of two circuits, each of which is embodied to implement a three-layer neural network. The circuit receives an initial input. The initial input may be an image. The input image is of dimensions H x W x C, where C=3 for RGB images, where H and W stand for the image height and width in pixels, and C denotes the number of channels. For example, in the Cats vs Dogs dataset, H=W=150 and C=3. The circuit divides the image into $m_1$ patches, each patch size being of size $n_1$. In the Cats vs Digs dataset, the image is broken into $m_1=100$ patches, each of size $n_1=(15 \times 15 \times 3)=675$. The two three-layer neural networks include a first three-layer neuron circuit (3LC1) and a second three-layer neuron circuit (3LC2).

The first three-layer neuron circuit (3LC1) is configured to receive the 100 patches as inputs. The first three-layer neuron circuit (3LC1) transforms each patch from dimension $n_1=675$ dimensions to $n_2=20$ dimensions, so that the transformed output comprising has $m_1$ patches or tensors, each of dimension $n_2$. The transformation applied by the first three-layer neuron circuit (3LC1) is learnt by applying the training algorithm, and the same transformation is applied on all patches identically. In Cats vs Dogs, $n_2=20$, resulting in $m_1=100$ patches of $n_2=20$ dimensions. The resulting matrix is of size $m_1 \times n_2$ or $100 \times 20$ in size. This matrix is transposed and provided as input to the second three-layer neuron circuit (3LC2), so that the input to 3LC2 is of size $n_2 \times m_1$, i.e. for the Cats vs Dogs dataset it is a matrix of size $20 \times 100$.

The second three-layer neuron circuit (3LC2) configured to receive the $n_2 \times m_1$ matrix as input and generate $m_2$ global feature vectors, each capturing inter-patch relationships across the $m_1$ patches. For Cats vs Dogs, $m_2=10$, so the output is a $20 \times 10$ matrix. These 200 values are then input to a single-layer linear classifier to predict the image class. Alternatively, one can input these 200 values to a two-layer neural network circuit employed as a classifier to predict the image class.

The first and second three layer neuron circuits are trained using the back-propagation algorithm using a cross-entropy loss function. The trained neural network is tested on the test data of the Cats vs Dogs dataset.

As a comparison point, the same dataset was used with the visual transformer architecture. The visual transformer used for images involves 1 layer for encoding an image region into patches; 2 layers for attention, followed by a 2 layer neural network that is part of the transformer architecture, which is 5 layers in all, per transformer stage. The representation ability of a transformer network is increased by using multiple attention units in parallel (termed as multi-attention heads) and by increasing the number of stages used. In order to accomplish a recognition task on the Cats vs Dogs dataset, 3 stages were used. This is 14 layers in all, since no encoding layer is needed in stages after the first. This means use of multiple attention heads (8 in this case), which allow the neural network focus on different parts of the image simultaneously and use of multiple stages (3 stages), which increases depth and learning capacity.

Table VI shows a comparison between the three-layer neural networks

| | Architecture used | Cats vs Dogs Dataset |
|---|---|---|
| Visual Transformer | Accuracy | 71.44% |
| | No. Of Parameters | 1285192 |
| | Mflops (Inferencing) | 160 |
| | GFlops (Training/batch) | 4800 |
| Two 3-layer circuit | Accuracy | 76.16% |
| | No. Of Parameters | 114902 |
| | Mflops (Inferencing) | 9.49 |
| | GFlops (Training/batch) | 1138 |

The two three-layer neural network uses substantially fewer parameters, needs much less computation to train and infer data, and also yields higher accuracies. A remark in order is that using models pre-trained on large amounts of data and fine-tuning them on smaller datasets can yield even higher performance, but these results relate to models that have been trained ab initio.

The three layer circuit represent shapes and functions by suitable choices of the weights associated with inputs at levels 1, 2, and 3. As an example embodiment, consider the circuit with 2 inputs $x_1$ and $x_2$, two processing layers in the first level, three layers in the second level, and layer in third level. The weights of the first level inputs are as follows: $u_{11}=1$, $u_{21}=0$, $u_{21}=0$, and $u_{22}=1$. The outputs of first level layers are $$y_1 = \log(x_1)$$

$$y_2 = \log(x_2)$$

The weights associated with the second layer inputs are $v_{11}=2$, $v_{12}=0$, $v_{21}=0$, $v_{22}=2$, $v_{31}=1$, $v_{32}=1$. The outputs of second layers are given by $$z_1 = \exp(2y_1) = x_1^2$$

$$z_2 = \exp(2y_2) = x_2^2$$

$$z_3 = \exp(y_1 + y_2) = x_1 \cdot x_2$$

The weights associated with the third level inputs are $w_{11}=1$, $w_{12}=1$, $w_{13}=2$. The output of the level 3 PU is given by $$t_1 = x_1^2 + x_2^2 + 2x_1 x_2$$

Consider a copy of the third layer neuron circuit with one change—$w_{13}=3$. The output tr changes, to $$t_1 = x_1^2 + x_2^2 + 3x_1 x_2$$

The weights for the first layer and the second layer inputs are similar for similar polynomial functions. This means if two polynomials are close in nature, their associated weights at these layers will also be close.

The weights of the second layer inputs affect the degree of the polynomial and determine type of function or shape being represented. Theis means changing weights the second layer inputs change the function class or shape fundamentally.

The circuit consider two functions can be termed identical if they have identical weight vectors, and similar if they have similar weights, with layer 2 weights being nearly identical. The shapes can be represented as functions, e.g. a circle of radius R centered at $(\alpha, \beta)$ can be represented by using a function of the form $$t_1 = (x_1 - \alpha)^2 + (x_2 - \beta)^2 - R^2$$

since setting $t_l$ to 0 is the locus of points on the circle. The circle with similar radius, or a nearby point as centre, will have similar co-efficients.

The function $$t_1 = (u_{11}x_1 - \alpha)^2 + (u_{22}x_2 - \beta)^2 - R^2$$

for $u_{11} > 1$ and $u_{22} > 1$ relates to an ellipse, which is a similar shape but not identical to the circle.

However, changing the weights of the second layer inputs leads to very different functions. For example, $$t_1 = (u_{11}x_1 - \alpha)^3 + (u_{22}x_2 - \beta)^3 - R^2$$

does not resemble the circle or ellipse at all. i.e., the cubic terms generate the function non-symmetric and highly non-linear, leading to distorted or irregular regions no longer resembling familiar conic shapes like ellipses or circles.

In some embodiments, the function can be encoded in terms of the weights of inputs associated with the first layer, second layer and third layer. The circuit 100 encrypts and decrypts the input using two-three-level neural circuit without skip connection. The two three-level neural circuit includes a first three-layer neuron circuit (3LC1) and a second three-layer neuron circuit (3LC2). Each circuit comprising three processing layers with n inputs at first level denoted $x_1, x_2, \ldots, x_n$. configured for exact encryption and decryption of n-dimensional input. The inputs are associated with weights of the first, second, and third level inputs are represented by matrices U, V, and W, where $u_{ij}$ is the weight of the connection from input $x_j$ to the i-th first layer neuron circuit (3LC1), $v_{ki}$ is the weight of the connection from the output of the i-th first layer neuron circuit (3LC1) to the k-th second layer neuron circuit (3LC1) and $w_{lk}$ is the weight of the connection from the output of the k-th second layer neuron circuit (3LC1) to the l-th third layer neuron circuit (3LC1).

The circuit encodes and transforms each of the n third level outputs of 3LC1 to versions of the inputs. The outputs are weighted sums of products of polynomial functions of the inputs $(x_1, x_2, \ldots, x_n)$. The n third level outputs of 3LC1 are encrypted versions of the inputs from which the inputs $(x_1, x_2, \ldots, x_n)$ are difficult to recover, effectively encrypting them The circuit 100 fed the n third level outputs of 3LC1 as inputs to the second layer neuron circuit 3LC2, which has no skip connection, The number of processing layers in a first layer, a second layer, and a third layer of the 3LC2 are all equal to n. The weights of the first, second, and third level inputs are represented by matrices P, Q, and R, where $p_{ij}$ is the weight of the connection from input $x_j$ to the i-th first layer neuron circuit of 3LC2. $q_{ki}$ is the weight of the connection from the output of the i-th first layer neuron circuit of 3LC2 to the k-th second layer neuron circuit of 3LC2, and $w_{ik}$ is the weight of the connection from the output of the k-th second layer neuron circuit of 3LC2 to the l-th third layer neuron circuit of 3LC2. Using basic matrix algebra, if all these matrices contain real-valued elements and satisfy the conditions:

$$WP^T = I, VQ^T = I, UR^T = I$$

where I is a n×n identity matrix, where $P^T$, $Q^T$, and $R^T$ are the transposed versions of matrices P, Q, and R, respectively, then the third level outputs of the 3LC2 are identical to the inputs $(x_1, x_2, \ldots, x_n)$. Thus, the 3LC2 performs the task of decryption of the encrypted output of the 3LC1. If the matrix elements are complex-valued, the matrices should satisfy, $$WP^{\#T} = I, VQ^{\#T} = I, UR^{\#T} = I$$

for the third level outputs of the 3LC2 to be identical to the first level inputs of the 3LC1. The encryption and decryption are exact in this case using the combination of 3LC1 and 3LC2. The encryption and decryption matrices are separate and one is used for encryption while the other is used for decryption. Where, $P^{\#T}$, $Q^{\#T}$, and $R^{\#T}$ are the conjugated and transposed versions of matrices P, Q, and R, respectively.

As an example embodiment of the use of a 3 level circuit for encryption, consider a first circuit 3LC1 with 4 inputs $(x_1, x_2, x_3, x_4)$. The circuit has 4 processing units at levels 1, 2, and 3. The weight matrices associated with inputs at levels 1, 2, and 3 are U, V, and W, and are all complex valued. In the example embodiment, the symbol i is the imaginary number denoting $\sqrt{-1}$.

The circuit 100 fixes the weight matrix for first level inputs of 3LC1 to $$U = \begin{bmatrix} -0.658 + 0.201i & 0.102 + 0.436i & 0.016 + 0.376i & -0.324 + 0.283i \\ 0.26 + 0.383i & -0.095 - 0.234i & 0.079 + 0.066i & -0.797 - 0.278i \\ 0.363 + 0.385i & -0.115 + 0.439i & -0.695 + 0.113i & 0.135 - 0.019i \\ 0.082 - 0.162i & 0.545 + 0.483i & 0.026 - 0.593i & -0.255 - 0.14i \end{bmatrix}$$

Similarly, circuit 100 fixes the weight matrix for second level inputs of 3LC1 to $$V = \begin{bmatrix} -0.429 + 0.366i & -0.2 + 0.637i & -0.001 - 0.362i & 0.311 + 0.087i \\ 0.116 + 0.366i & -0.278 - 0.291i & -0.15 + 0.47i & 0.626 + 0.237i \\ 0.562 - 0.434i & -0.211 + 0.268i & -0.403 - 0.285i & 0.176 + 0.322i \\ 0.167 + 0.045i & 0.195 + 0.487i & 0.344 + 0.513i & -0.239 + 0.506i \end{bmatrix}$$

The circuit 100 fixes the weight matrix for third level inputs of 3LC1 to $$W = \begin{bmatrix} -0.148 - 0.317i & -0.236 - 0.157i & 0.253 + 0.362i & -0.344 + 0.696i \\ -0.073 - 0.202i & -0.298 + 0.007i & 0.571 - 0.529i & -0.386 - 0.331i \\ -0.262 + 0.852i & 0.039 - 0.001i & 0.229 + 0.186i & -0.342 - 0.003i \\ -0.19 + 0.001i & 0.492 - 0.766i & 0.06 - 0.329i & 0.067 + 0.136i \end{bmatrix}$$

The circuit 100 provides a set of four inputs $(x_1, x_2, x_3, x_4) = (-6, 0, 1, 2)$ to the first level of circuit 3LC1. Circuit 3LC1 computes an encrypted set of 4 values given by (−2.1059+0.924i, 3.9956−5.3823i, 1.3085-1.0467i, 1.0803+1.4687i)

Where i is the imaginary number denoting $\sqrt{-1}$.

The example embodiment provides these encrypted values to a second 3 level circuit 3LC2 with 4 inputs, and 4 processing units at levels 1, 2, and 3. The weight matrices of circuit 3LC2 associated with inputs at levels 1, 2, and 3 are P, Q, and R, respectively, and are all complex valued. The circuit 100 fixes the weight matrix for first level inputs of 3LC2 to $$P =$$

$$\begin{bmatrix} -0.148 + 0.317i & -0.073 + 0.202i & -0.262 - 0.852i & -0.19 - 0.001i \\ -0.236 + 0.157i & -0.298 - 0.007i & 0.039 + 0.001i & 0.492 + 0.766i \\ 0.253 - 0.362i & 0.571 + 0.529i & 0.229 - 0.186i & 0.06 + 0.329i \\ -0.344 - 0.696i & -0.386 + 0.331i & -0.342 + 0.003i & 0.067 - 0.136i \end{bmatrix}$$

The circuit 100 fixes the weight matrix for second level inputs of 3LC2 to $$Q =$$

$$\begin{bmatrix} -0.429 - 0.366i & 0.116 - 0.366i & 0.562 + 0.434i & 0.167 - 0.045i \\ -0.2 - 0.637i & -0.278 + 0.291i & -0.211 - 0.268i & 0.195 - 0.487i \\ -0.001 + 0.362i & -0.15 - 0.47i & -0.403 + 0.285i & 0.344 - 0513i \\ 0.311 - 0.087i & 0.626 - 0.237i & 0.176 - 0.322i & -0.239 - 0.506i \end{bmatrix}$$

The circuit 100 fixes the weight matrix for third level inputs of 3LC2 to $$R =$$

$$\begin{bmatrix} -0.658 - 0.201i & 0.26 - 0.383i & 0.363 - 0.385i & 0.082 + 0.162i \\ 0.102 - 0.436i & -0.095 + 0.234i & -0.115 - 0.439i & 0.545 - 0.483i \\ 0.016 - 0.376i & 0.079 - 0.066i & -0.695 - 0.113i & 0.026 + 0.593i \\ -0.324 - 0.283i & -0.797 + 0.278i & 0.135 + 0.019i & -0.255 + 0.14i \end{bmatrix}$$

Circuit 100 feeds the outputs of level 3 of circuit 3LC1 as first level inputs to circuit 3CL2, i.e. it provides the 4 values (−2.1059+0.924i, 3.9956−5.3823i, 1.3085-1.0467i, 1.0803+1.4687i). The third level outputs of 3LC2 are computed as (−6, 0, 1, 2), which are identical to the first level inputs to circuit 3LC1.

FIGS. 8A and 8B are flow diagrams that illustrate a method of a circuit for efficiently performing operations on input data to compute an interpretable and differentiable function according to some embodiments herein. At step 802, the method includes obtaining, using at least one first level processing unit, one or more first level inputs, wherein each first level input is associated with a first level weight. At step 804, the method includes computing, using a first level multiply-add (MA) unit, a first level weighted sum of the one or more first level inputs by first multiplying each first level input with the associated first level weight to compute a first level product and adding the computed first level products. The first level weighted sum is the weighted sum of the first-level inputs.

At step 806, the method includes computing, using a logarithmic unit, a first level output by performing a logarithmic operation on the first level weighted sum. The first level output is the logarithm of the first-level weighted sum of the first level inputs. At step 808, the method includes obtaining, using at least one second level processing unit, one or more second level inputs comprising the first level output of each first level processing unit or at least one of (i) the one or more first level inputs of each first level processing unit (ii) the first level weighted sum of each first level processing unit and (iii) the first level output of each first level processing unit. Each second level input is associated with a second level weight At step 810, the method includes computing, using a second level multiply-add (MA) unit, a second level weighted sum of the one or more second level inputs by multiplying each second level input with the associated second level weight to compute a second level product, and adding the computed second level products. The second level weighted sum is a weighted sum of the second level inputs. At step 812, the method includes computing, using an antilog unit, a second level output by performing an antilog operation on the second level weighted sum. The second level output is a product of (i) weighted polynomials of the one or more first level inputs and (ii) weighted exponentials of the one or more first level inputs and (iii) weighted exponentials of the one or more first level weighted sum of the first level processing units. The second level output is an interpretable and differentiable function.

The method has of advantage that the method enables optimization of computational resources for learning complex input-output mappings. By utilizing the architecture of the interpretable neural network with three layers of neurons, where each layer is configured to output a weighted sum of products of polynomials, the method achieves a balance between computational efficiency and model complexity. The method enables efficient representation of non-linear relationships within the data while maintaining interpretability, enabling the method to learn complex input-output mappings with reduced computational overhead as compared to traditional deep neural networks.

Further, by enabling learning of a smooth, many-times differentiable functions to represent input-output mappings, the method reduces the computational overhead associated with iterative optimization. Furthermore, expressions for partial and higher order derivatives of all orders are available for the learnt input-output relationship, in an algebraic form. This enables a simple computation of partial or higher order derivatives of any output or intermediate output with respect to any input or intermediate inputs of the interpretable neural network.

The availability of derivatives and partial derivatives of all orders without any additional effort, in an algebraic form is of significant value in engineering applications where sensitivity analysis is required for design. The availability of derivatives and partial derivatives also facilitates optimization of designs using methods that require the computation of the gradient for the optimization task.

Because the proposed architecture is able to learn a very large categories of analytical and other functions, the method empirically yields better results than traditional neural network approaches Since the output of any neuron in the interpretable neural network can be expressed as an algebraic expression that depends on the primary inputs to the neural network, the neural network model, once trained on a dataset, enables facile interpretation of relationship between (a) inputs and outputs, (b) inputs and intermediate outputs, etc. By making the weights of the first layer of the neural network a diagonal set of connections, and by introducing a regularizer on the weights of the first layer as part of the loss function being minimized, the method is enabled to minimize the features used or constructed by later layers to learn an input-output mapping based on a given dataset. Thereby, a simple mechanism of feature selection is enabled, even though the features may be used in very complex combinations in later layers of the interpretable neural network.

In some embodiments, skip connections are incorporated in the interpretable neural network to learn functions comprised of terms that depend on a weighted combination of inputs in at least one of a linear manner, a logarithmic manner, or an exponential manner.

In some embodiments, the skip connections are between non-successive layers of the interpretable neural network or between an input layer of the interpretable neural network and an output layer of the interpretable neural network.

In some embodiments, the interpretable neural network is combined with conventional neural networks by adding more layers of neurons and weights between the 3 layers of neurons and individual neurons, or after the third layer of neurons In some embodiments, at least one of the inputs or weights of the interpretable neural network are complex numbers.

In some embodiments, the complex numbers are at least one of (i) a polar form or (ii) a sum of a real and imaginary number with a corresponding application of logarithm and exponential activation functions.

In some embodiments, the structure of the interpretable neural network is restricted by making values of the weight matrix of at least one layer as a diagonal matrix In some embodiments, the order of a logarithm activation functions and exponential activation functions are interchanged to enable learning of functions that change slowly.

In some embodiments, a selection of the base for the logarithm activation function as "g" is enabled, instead of the base of a Naperian logarithm e≈2.71828 wherein the exponential activation function $e^{input}$ is replaced by $g^{input}$ In some embodiments, "g" is chosen to be 2 (i.e. g=2), to facilitate implementation on a digital computer or for a hardware realization. In some embodiments, "g" is chosen to be a power of 2 (i.e. $g=2^k$, with k being a positive integer), to enable implementation on a digital computer or for a hardware realization.

In some embodiments, the structure of the interpretable neural network is restricted by making the weight matrix of at least one layer as a diagonal matrix as well as integers to facilitate interpretation.

In some embodiments, representation power of the interpretable neural network is increased by repeating the 3 layers of neurons after the third layer of neurons in the interpretable neural network. The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A circuit for efficiently performing operations on input data to compute an interpretable and differentiable function, comprising:

a memory that comprises a first set of instructions and a second set of instructions; and at least one first level processing unit that executes the first set of instructions and is configured to:

obtain one or more first level inputs, wherein each first level input is associated with a first level weight, the first level processing unit comprising:

(i) a first level multiply-add (MA) unit that is configured to compute a first level weighted sum of the one or more first level inputs by multiplying each first level input with the associated first level weight to compute a first level product and adding the computed first level products, wherein the first level weighted sum is the weighted sum of the first-level inputs; and (ii) a log circuit that is configured to compute a first level output by performing a logarithmic operation on the first level weighted sum, wherein the first level output is the logarithm of the first-level weighted sum of the first level inputs; and at least one second level processing unit that executes the second set of instructions and is configured to:

obtain one or more second level inputs comprising the first level output of each first level processing unit or at least one of (i) the one or more first level inputs of each first level processing unit (ii) the first level weighted sum of each first level processing unit and (iii) the first level output of each first level processing unit, wherein each second level input is associated with a second level weight, the second level processing unit comprising:

(i) a second level multiply-add (MA) unit that is configured to compute a second level weighted sum of the one or more second level inputs by multiplying each second level input with the associated second level weight to compute a second level product, and adding the computed second level product, wherein the second level weighted sum is a weighted sum of the second level inputs; and (ii) an antilog circuit that is configured to compute a second level output by performing an antilog operation on the second level weighted sum, wherein the second level output is a product of weighted polynomials of the first level inputs or a product of (i) weighted polynomials of the one or more first level inputs and (ii) weighted exponentials of the one or more first level inputs and (iii) weighted exponentials of the one or more first level weighted sum of the first level processing units, wherein the second level output is the interpretable and differentiable function, wherein the memory is configured to store (i) the first level inputs, the first level weights, the first level weighted sums, the first level output of each first level processing unit, and (ii) the second level inputs, the second level weights, the second level weighted sums, and the second level output of each second level processing unit.

2. The circuit of claim 1, wherein the first set of instructions and the second set of instructions are configured to initialize the weights of the one or more first level inputs and the one or more second level inputs to compute the second level output corresponding to the one or more first level inputs, wherein the first set of instructions and the second set of instructions are configured to update the weights of the one or more first level inputs and the one or more second level inputs using a training algorithm that is selected from one or more training algorithms based on the first level inputs and the second level inputs, to learn an input-output mapping function when the circuit dynamically receives input data, wherein the first set of instructions and the second set of instructions are further configured to update the weights of the one or more first level inputs and the one or more second level inputs by (i) producing an expression corresponding to the second level output; and (ii) computing derivatives or partial derivatives of desired orders of the second level output by using the expression corresponding to the second level output, wherein the first set of instructions and the second set of instructions are further configured to determine an importance of the one or more first level inputs using the updated weights associated with the one or more first level inputs and the one or more second level inputs, removing near-zero weights assigned to at least one of the one or more first level inputs to improve efficiency and reduce overfitting, thereby the circuit automatically learns which first level inputs are more relevant during training; and wherein the circuit comprises a control unit that is configured to orchestrate the first set of instructions and the second set of instructions of the circuit.

3. The circuit of claim 1, the circuit comprising, at least one third level processing unit that executes a third set of instructions and is configured to:

obtain one or more third level inputs comprising (a) the second level output of the at least one second level processing unit or (b) the one or more first level inputs of each first level processing unit, the first level weighted sum of each first level processing unit, the first level output of each first level processing unit, the second level weighted sum of each second level processing unit, and the second level output of each second level processing unit, wherein each third level input is associated with a third level weight, the third level processing unit comprising, a third level multiply-add (MA) unit that is configured to compute a third level weighted sum of the one or more third level inputs by multiplying each third level input with the associated third level weight to compute a third level product, and adding the computed third level products, wherein the third level weighted sum is the weighted sum of the third level inputs of third level processing units, and compute a third level output by performing an output function operation on the third level weighted sum, wherein the third level output is the output function operated on the third level weighted sum.

4. The circuit of claim 3, the circuit comprising, the memory that is configured to store the third level inputs, the third level weights, the third level weighted sums, and the third level output of each third level processing unit;

the first set of instructions, the second set of instructions, and the third set of instructions that are configured to: initialize the weights of the one or more first level inputs, the one or more second level inputs, and the one or more third level inputs to compute the third level output, wherein the first set of instructions, the second set of instructions, and the third set of instructions are further configured to update the weights of the one or more first level inputs, the one or more second level inputs, and the one or more third level inputs by (i) producing an expression corresponding to the third level output; and (ii) computing derivatives or partial derivatives of desired orders of the third level output by using the expression corresponding to the third level output; and a control unit configured to orchestrate the first set of instructions, the second set of instructions, and the third set of instructions of the circuit.

5. The circuit of claim 4, wherein the circuit is configured to represent shapes and functions by using the weights of the first level, second level, and third level processing units, wherein the circuit is configured to identify similar shapes and functions by matching the weights corresponding to stored shapes and functions with the weights corresponding to shapes and functions in the input.

6. The circuit of claim 3, wherein the second level weights associated with the second level inputs of the processing unit are all set to one to further optimize computational efficiency.

7. The circuit of claim 3, wherein weights of a first circuit are initialized and modified by configuring the first set of instructions, the second set of instructions, and the third set of instructions that operate on the weighted sums, the inputs, and the outputs of the first circuit and one or more second circuits.

8. The circuit of claim 3, wherein the first circuit is configured to produce an encrypted signal of the input, wherein the second circuit decrypts of the encrypted signals by a second three layer circuit, with the weights associated with the first, second, and third level inputs of the second circuit having condition with the weights associated with the third, second, and first layer inputs of the first circuit, respectively, wherein the weights of the connections are represented by matrices, wherein the matrices satisfy the conditions to enable the decryption, wherein the conditions are if all matrices contain real-valued elements or if the matrices contain complex-valued elements, wherein a number of inputs, and a number of processing units at the first, second, and third levels are all equal.

9. The circuit of claim 3, wherein the third level outputs of the first circuit are fed to the a second circuit as input, wherein the first circuit encodes the first level inputs of the first circuit to produce the third level outputs to change a dimensionality of the input that is suitable for the second circuit; and wherein the second circuit is configured to decode the third level outputs of the first circuit to produce the first level inputs of the first circuit.

10. The circuit of claim 1, wherein the second level output is a product of degree one polynomials of the one or more first level inputs, wherein the second level output is the interpretable and differentiable function composed of a product of linear polynomials, wherein different differentiable functions are computed by changing the weights associated with first level inputs.

11. The circuit of claim 1, wherein the circuit is embodied to implement a two-layer neural network, comprising:

(a) at least one of first layer neuron circuit that obtains one or more first layer inputs, each first layer input associated with a first layer weight, wherein each first layer neuron circuit is configured to (i) compute a first layer weighted sum by multiplying each first layer input with the associated first layer weight to compute a first layer product and adding the computed first layer products, and (ii) pass the first layer weighted sum through a logarithm activation function to produce a first layer neuron output, wherein the first layer weighted sum is a weighted sum of the first level inputs, and wherein the first layer output is the logarithm of the first layer weighted sum of the first layer inputs; and (b) at least one second layer neuron circuit that obtains at least one of second layer inputs comprising the one or more first layer inputs of each first layer neuron circuit, the first layer weighted sum of each first layer neuron circuit, and the first layer output of each first layer neuron circuit, wherein each second layer input is associated with a second layer weight;

wherein each second layer neuron circuit is configured to (i) compute a second layer weighted sum by multiplying each second layer input by the associated second layer weight to compute a second layer product, and adding the computed second layer products, and (ii) pass the second layer weighted sum through an antilog activation function to produce a second layer neuron output;

wherein the second layer output comprises a product of (i) weighted polynomials of the one or more first layer inputs, (ii) the weighted exponentials of the first layer inputs, and (iii) weighted exponentials of the first layer weighted sums.

12. The circuit of claim 11, wherein the circuit is embodied to implement the two-layer neural network capable of inferencing and learning the weights of the one or more first layer inputs of each first layer neuron circuit, the weights of the one or more second layer inputs of each second layer neuron circuit, and the second layer output of each second layer neuron circuit, wherein the circuit:

selects a training algorithm to compute the weights of the circuit used in the two-layer neural network, using the first layer inputs and the second layer inputs obtained for training the neural network;

executes the selected training algorithm;

uploads the weights associated with the one or more first layer inputs and the one or more second layer inputs into the circuit using the first set of instructions, and the second set of instructions, wherein the first set of instructions, and the second set of instructions are defined for inferencing; and generates, by the two-layer neural network, the second level output using the updated weights learned by the selected training algorithm.

13. The circuit of claim 11, wherein the circuit is embodied to implement a three-layer neural network comprising:

at least one of third layer neuron circuit that obtains at least one of third layer input, comprising the one or more first layer inputs of each first layer neuron circuit, the first layer weighted sum of each first layer neuron circuit, the first layer output of each first layer neuron circuit, the second layer output of each second layer processing unit, the second layer weighted sum of each second layer neuron circuit, and the second layer output of each second layer neuron circuit, wherein each third layer neuron circuit is configured to, (i) compute a third layer weighted sum by multiplying each third layer input by an associated third layer weight to compute a third layer product and add the computed third layer products; and (ii) produce a third layer output by passing the third layer weighted sum through an output activation function, wherein the third layer output is the output activation function applied to the third layer weighted sum.

14. The circuit of claim 13, wherein the circuit is embodied to implement the three-layer neural network capable of inferencing and learning the associated weights of the one or more first layer inputs of each first layer neuron circuit, the associated weights of the one or more second layer inputs of each second layer neuron circuit, the second layer output of each second layer neuron circuit, the associated weights of the one or more third layer inputs of each first third layer neuron circuit, and the third layer output of each third layer neuron circuit, wherein the circuit, selects a training algorithm to compute the weights of the circuit used in the three-layer neural network, using the first layer inputs, the second layer inputs, the third layer inputs, the first layer outputs, the second layer outputs, and the third layer outputs obtained for training the neural network;

executes the selected training algorithm;

uploads the weights associated with the one or more first layer inputs, the weights associated with one or more second layer inputs, and the weights associated with one or more third layer inputs into the circuit using the first set of instructions, the second set of instructions, and the third set of instructions, wherein the first set of instructions, the second set of instructions, and the third set of instructions are defined for inferencing; and generates, by the three-layer neural network, the third layer outputs using the updated weights learned by the selected training algorithm.

15. A method for efficiently performing operations on input data to compute an interpretable and differentiable function implemented by a circuit, the method comprising:

obtaining, by at least one first level processing unit of the circuit, one or more first level inputs, wherein each first level input is associated with a first level weight;

computing, by the at least one first level processing unit, a first level weighted sum of the one or more first level inputs by multiplying each first level input by the associated first level weight to compute a first level product and adding the computed first level products, wherein the first level weighted sum is the weighted sum of the first-level inputs;

computing, by the at least one first level processing unit, a first level output by performing a logarithmic operation on the first level weighted sum, wherein the first level output is the logarithm of the first-level weighted sum of the first level inputs;

performing a skip connection to obtain, by at least one second level processing unit of the circuit, one or more second level inputs by selecting from among at least one of (i) the one or more first level inputs of each first level processing unit (ii) the first level weighted sum of each first level processing unit and (iii) the first level output of each first level processing unit, wherein each second level input is associated with a second level weight;

computing, by the at least one second level processing unit, a second level weighted sum of the one or more second level inputs by multiplying each second level input with the associated second level weight to compute a second level product, and adding the computed second level product, wherein the second level weighted sum is a weighted sum of the second level inputs; and computing, by the at least one second level processing unit, a second level output by performing an antilog operation on the second level weighted sum, wherein the second level output is a product of weighted polynomials of the first level inputs or a product of (i) weighted polynomials of the one or more first level inputs and (ii) weighted exponentials of the one or more first level inputs and (iii) weighted exponentials of the one or more first level weighted sum of the first level processing units, wherein the second level output is the interpretable and differentiable function, wherein circuit comprises a memory that is configured to store (i) the first level inputs, the first level weights, the first level weighted sums, the first level output of each first level processing unit, and (ii) the second level inputs, the second level weights, the second level weighted sums, and the second level output of each second level processing unit; and initializing, by a first set of instructions and a second set of instructions in the memory, the weights of the one or more first level inputs and the one or more second level inputs to compute the second-level output corresponding to the one or more first level inputs; and orchestrating, by a control unit of the circuit, the first set of instructions and the second set of instructions of the circuit.

16. The method of claim 15, wherein the first set of instructions and the second set of instructions are configured to update the weights of the one or more first level inputs and the one or more second level inputs using a training algorithm that is selected from one or more training algorithms based on the first level inputs and the second level inputs, to learn an input-output mapping function when the circuit dynamically receives input data, wherein the first set of instructions and the second set of instructions are further configured to update the weights of the one or more first level inputs and the one or more second level inputs by (i) producing an expression corresponding to the second level output; and (ii) computing derivatives or partial derivatives of desired orders of the second level output by using the expression corresponding to the second level output, wherein the first set of instructions and the second set of instructions are further configured to determine an importance of the one or more first level inputs using the updated weights associated with the one or more first level inputs and the one or more second level inputs, removing near-zero weights assigned to at least one of the one or more first level inputs to improve efficiency and reduce overfitting, thereby the circuit automatically learns which first level inputs are more relevant during training.

17. The method of claim 15, the method comprising, obtaining, by at least one third level processing unit of the circuit, one or more third level inputs comprising (a) the second level output of the at least one second level processing unit or (b) the one or more first level inputs of each first level processing unit, the first level weighted sum of each first level processing unit, the first level output of each first level processing unit, the second level weighted sum of each second level processing unit, and the second level output of each second level processing unit, wherein each third level input is associated with a third level weight;

computing, by the at least one third level processing unit, a third level weighted sum of the one or more third level inputs by multiplying each third level input with the associated third level weight to compute a third level product, and adding the computed third level products, wherein the third level weighted sum is the weighted sum of the third level inputs of third level processing units; and computing, by the at least one third level processing unit, a third level output by performing an output function operation on the third level weighted sum, wherein the third level output is the output function operated on the third level weighted sum.

18. The method of claim 17, the method comprising, storing the third level inputs, the third level weights, the third level weighted sums, and the third level output of each third level processing unit in the memory;

initializing, by the first set of instructions, the second set of instructions, and the third set of instructions stored in the memory, the weights of the one or more first level inputs, the one or more second level inputs, and the one or more third level inputs to compute the third level output, wherein the first set of instructions, the second set of instructions, and the third set of instructions are further configured to update the weights of the one or more first level inputs, the one or more second level inputs, and the one or more third level inputs by (i) producing an expression corresponding to the third level output; and (ii) computing derivatives or partial derivatives of desired orders of the third level output by using the expression corresponding to the third level output; and orchestrating, by the control unit of the circuit, the first set of instructions, the second set of instructions, and the third set of instructions of the circuit.

19. The method of claim 15, wherein the second level output is a product of degree one polynomials of the one or more first level inputs, wherein the second level output is the interpretable and differentiable function composed of a product of linear polynomials, wherein different differentiable functions are computed by changing the weights associated with first level inputs.

20. The method of claim 15, wherein the second level weights associated with the second level inputs of the processing unit are all set to one to further optimize computational efficiency.

\*  \*  \*  \*  \*